United States Patent
Yamaguchi et al.

(10) Patent No.: US 6,849,222 B2
(45) Date of Patent: Feb. 1, 2005

(54) METHOD OF MANUFACTURING CERAMIC HONEYCOMB STRUCTURE AND DEVICE FOR FORMING THROUGH HOLES

(75) Inventors: Satoru Yamaguchi, Anjyou (JP); Hitoshi Kanmura, Mie-pref. (JP); Akinobu Muto, Aichi-pref. (JP); Toshiaki Tanida, Okazaki (JP)

(73) Assignee: Denso Corporation (JP)

( * ) Notice: Subject to any disclaimer, the term of this patent is extended or adjusted under 35 U.S.C. 154(b) by 7 days.

(21) Appl. No.: 09/853,028

(22) Filed: May 11, 2001

(65) Prior Publication Data

US 2002/0020944 A1 Feb. 21, 2002

(30) Foreign Application Priority Data

| May 12, 2000 | (JP) | 2000-140213 |
| Jul. 27, 2000 | (JP) | 2000-227490 |
| May 9, 2001 | (JP) | 2001-139177 |

(51) Int. Cl.[7] .......................... B29C 26/00; B29C 57/10
(52) U.S. Cl. ................... 264/400; 264/40.1; 264/156; 264/267; 264/269; 264/273; 264/406; 264/482; 219/121.71; 219/121.82; 219/121.83
(58) Field of Search ................. 264/122, 156, 264/267, 269, 273, 400, 482, 628, 40.1; 219/121.7, 121.71, 121.82, 121.83; 156/253, 298, 310; 55/523, 498, DIG. 30

(56) References Cited

U.S. PATENT DOCUMENTS

| 4,293,357 A | * | 10/1981 | Higuchi et al. | 156/89 |
| 4,378,395 A | * | 3/1983 | Asoshina et al. | 428/158 |
| 4,403,008 A | * | 9/1983 | Factor | 428/117 |
| 4,411,856 A | * | 10/1983 | Montierth | 264/267 |
| 4,432,918 A | * | 2/1984 | Paisley | 264/43 |
| 4,557,773 A | * | 12/1985 | Bonzo | 156/64 |
| 4,559,193 A | * | 12/1985 | Ogawa et al. | 264/60 |
| 5,868,950 A | * | 2/1999 | Noddin | 216/18 |
| 6,090,330 A | * | 7/2000 | Gawa et al. | 264/400 |

FOREIGN PATENT DOCUMENTS

| JP | 63-134018 | * | 6/1988 |
| JP | 03-169312 | * | 7/1991 |
| JP | 9-25180 | | 1/1997 |
| JP | 2870890 | | 1/1999 |
| JP | 2946598 | | 7/1999 |

* cited by examiner

*Primary Examiner*—Stefan Staicovici
(74) *Attorney, Agent, or Firm*—Nixon & Vanderhye PC

(57) ABSTRACT

A method of manufacturing a honeycomb structure and a through hole forming device used in the manufacture of the honeycomb structure are provided, in which the step of closing a part of the cell ends at an end surface of the honeycomb structure is rationalized. In closing a part of the cell ends (82) at the end surface (861) of a honeycomb structure body (86), a film (2) is attached to the end surface (861) of the honeycomb structure body (86) in such a manner as to cover the cell ends (82). The portion of the film (2) located at the cell ends (82) to be closed is thermally melted or burnt off thereby to form through holes (20). The end surface (861) is dipped in a slurry containing an end surface closing material, so that the slurry is caused to enter the cell ends (82) by way of the through holes (20). After that, the slurry is hardened while at the same time removing the resin film (2).

19 Claims, 13 Drawing Sheets

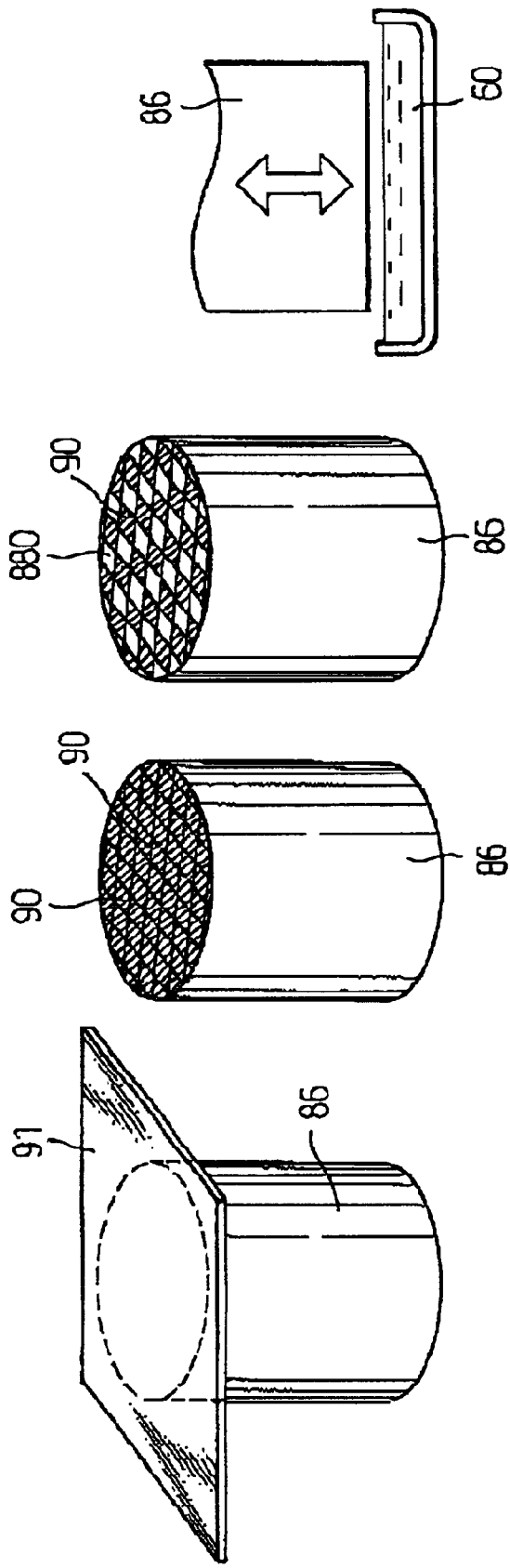

US 6,849,222 B2

METHOD OF MANUFACTURING CERAMIC HONEYCOMB STRUCTURE AND DEVICE FOR FORMING THROUGH HOLES

BACKGROUND OF THE INVENTION

1. Field of the Invention

The present invention relates to a method of manufacturing a ceramic honeycomb structure with some cell ends closed and a through hole forming device used for the process of manufacture.

2. Description of the Related Art

A filter structure for trapping the particulates in the exhaust gas of an automotive vehicle, for example, assumes the form of a ceramic honeycomb structure 8 in which a multiplicity of cells 88 are defined by partitioning walls 81 and alternate ones of the cells 88 have the ends thereof closed with a closing material 830, as shown in FIGS. 14(a) and 14(b).

In manufacturing the ceramic honeycomb structure 8 having this special form, as shown in FIG. 15, a body 86 of a honeycomb structure with the two ends of each of the cells 88 open is fabricated and a closing material 830 (FIGS. 14(a) and 14(b)) is filled to close the open cell ends.

In the prior art, the process for closing the cell ends of the honeycomb structure body 86 is performed in the following manner.

As shown in FIGS. 15(a) and 15(b), an end surface of the honeycomb structure body 86 is covered with a wax sheet 91 and pressed to fill the wax 90 in the ends of the cells 88. Then, as shown in FIG. 15(c), the wax 90 filled in the cell ends to be closed is scraped out manually using a jig or the like thereby to form open cell ends 880.

The honeycomb structure body 86 is dipped into a slurry 60 containing an end closing material with the end surface of the body 86 filled with the wax 90 down, so that the slurry 60 is caused to enter the cell ends 88 lacking the wax 90. The slurry 60 is then dried or baked while at the same time removing the wax 90. In the case where the closed portion 83 is formed at the two end surfaces of the honeycomb structure, the aforementioned process up to the dipping into the slurry is repeated for the other end surface.

The conventional method of manufacturing a honeycomb structure described above poses the following problems.

Specifically, as described above, the process for closing the cell ends includes a multiplicity of complicated steps of removing the filled in wax 90. With the decrease in the thickness of the honeycomb structure and the cell size, on the other hand, it has become increasingly difficult to manually remove the wax 90, thereby further adding to the number of steps.

Also, in the case where the closed portion 83 is formed at the two end surfaces of the honeycomb structure body 86, the process (masking) for filling the wax 90 and removing a part thereof is required for each of the two end surfaces. This is one of the processes for which improvement is required most of all the processes of manufacturing a honeycomb structure.

SUMMARY OF THE INVENTION

The present invention has been developed in view of the problems of the prior art described above, and is intended to provide a method of manufacturing a honeycomb structure and a through hole forming device used in the manufacturing process, wherein the steps of closing the ends of a part of the cells at least on an end surface of the honeycomb structure can be improved.

BRIEF DESCRIPTION OF THE DRAWINGS

FIGS. 11(a) to 11(d) are diagrams for explaining the manufacturing process according to a seventh embodiment of the invention, in which FIG. 11(a) is the step of attaching a resin film on the honeycomb structure body, FIG. 11(b) the step of forming through holes in the resin film, FIG. 11(c) the step of depositing the mask powder, and FIG. 11(d) the step of impregnating the cell ends with the slurry.

FIGS. 14(a) and 14(b) are diagrams for explaining the conventional honeycomb structure, in which FIG. 14(a) is a sectional view and FIG. 14(b) a front view.

FIGS. 15(a) to 15(d) are diagrams for explaining the step of closing the cell ends according to the prior art.

DESCRIPTION OF THE PREFERRED EMBODIMENTS

Figure 1:
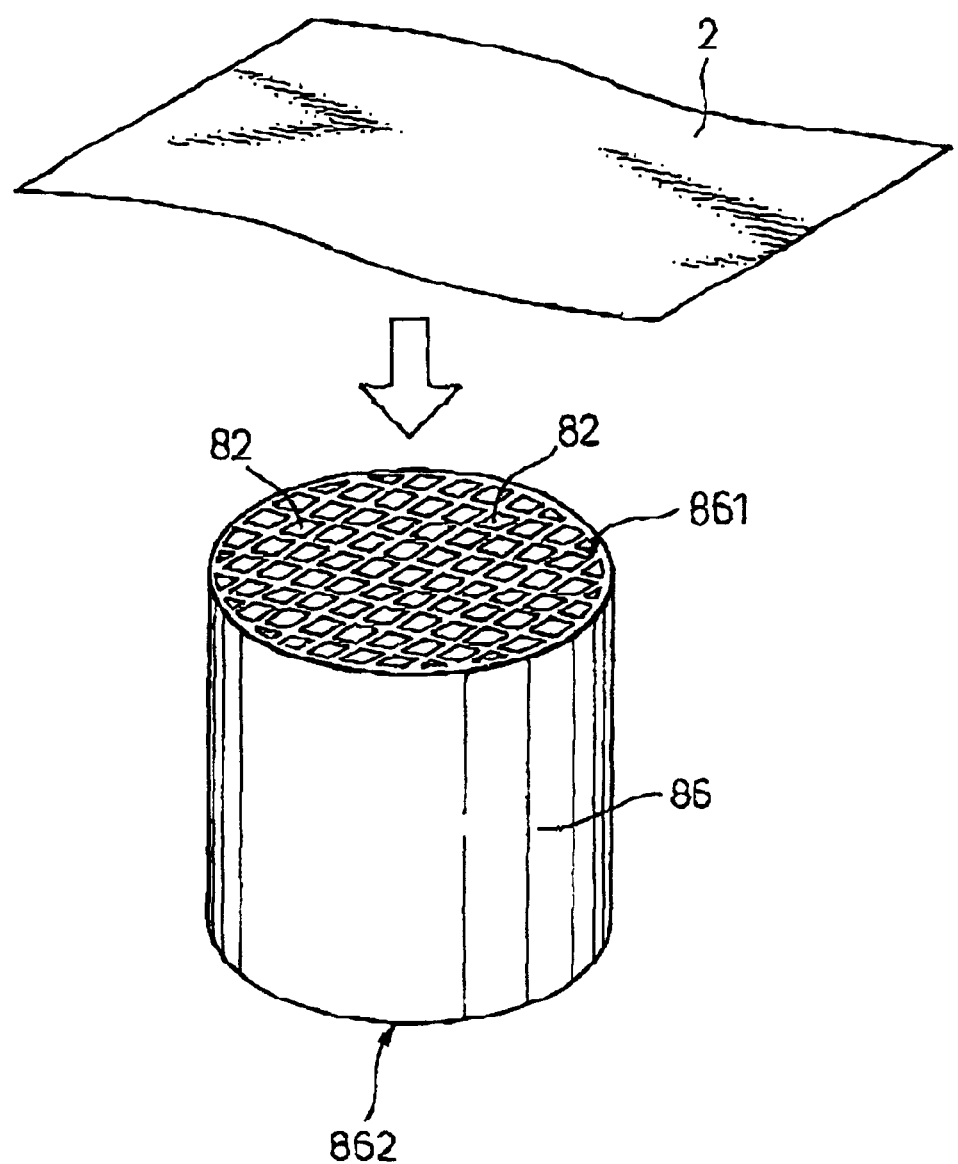
FIG. 1 is a diagram for explaining the step of attaching a resin film on the honeycomb structure body according to a first embodiment of the invention.

According to a first aspect of the invention, there is provided a method of manufacturing a ceramic honeycomb structure in which a part of the cell ends located at an end surface of the honeycomb structure are closed, comprising the steps of fabricating a honeycomb structure body with the cell ends opened at the end surfaces and closing a part of the cell ends at an end surface of the honeycomb structure body, the cell end closing step including the substeps of attaching a film to the end surface of the honeycomb structure body in such a manner as to cover at least a part of the cell ends, forming through holes by thermally melting or burning off the film located at the cell ends to be closed, dipping the end surface in a slurry containing an end surface closing material, causing the slurry to enter the cell ends by way of the through holes, and hardening the slurry while at the same time removing the film.

The most noticeable point in this aspect of the invention is that the film attached to an end surface is thermally melted or burned off to form the through holes.

The film is made of a resin that can be thermally melted or burned off. A film such as a thermoplastic synthetic resin, for example, can be used. Various methods of attaching the film can be employed, including a method using an adhesive film coated with an adhesive in advance, a method in which an adhesive is applied on the honeycomb structure body or the film in the film attaching step, or a method in which the film is fusion welded without using any adhesive.

The slurry containing the end surface closing material can be hardened by drying or baking or by any of other various hardening means.

The step of impregnating the cell ends with the slurry can be carried out either before or after baking the honeycomb structure body. According to whether this step is carried out before or after baking the honeycomb structure body, the composition of the slurry, the method of hardening of the slurry, etc. are preferably changed appropriately.

The operation and effects of this aspect of the invention will be explained.

According to this aspect of the invention, the film is attached to an end surface of the honeycomb structure body, and then the desired portions of the film are thermally melted or burned off to form through holes Therefore, the conventionally required step of scraping out the wax filled in is eliminated. In other words, since the through holes can be formed simply by heating the portions of the film to be formed with the through holes, there is no object to be removed physically and therefore the work is greatly simplified.

Even in the case where the process is carried out manually as in the prior art, therefore, the efficiency can be remarkably improved as compared with the conventional process of scraping out the wax filled in the cell ends. Further, automation with a machine can be facilitated.

After forming the through holes, the end surface is dipped in a slurry containing an end surface closing material, the cell ends are impregnated with the slurry by way of the through holes, and then the slurry is hardened thereby to form the closed portions. In this way, the cell ends can be easily closed.

The film can be finally removed by burning, for example. This work of removal is very easy. For removing the film, heat may be applied at the same time as or independently of any drying or baking of the slurry which may be done.

The film can alternatively be removed mechanically instead of by burning off.

As described above, in the manufacturing method according to this aspect of the invention, the step of closing a part of the cell ends at the end surface of the honeycomb structure body can be improved, resulting in a remarkable improvement of the productivity of the honeycomb structure with a part of the cell ends thereof closed as compared with the prior art.

The film used in this aspect of the invention may be made of a natural material such as cellophane or a synthesized material such as PET (polyethylene terephthalate), PP (polypropylene) or polyester.

According to a second aspect of the invention, there is provided a method of manufacturing a ceramic honeycomb structure, wherein the through holes are preferably formed in the film by radiating a high-density energy beam to the film and thereby thermally melting or burning off the film. In such a case, the film can be melted or burned off instantaneously by the heat transmitted from the high-density energy beam and the through holes can be easily formed. Further, the position at which the high-density energy beam is radiated can be controlled with so high a precision that the positions where the through holes are to be formed can be controlled accurately and the automation can be accomplished with comparative ease.

Also, the through holes of the film can be formed by bringing a heated jig into contact with the film and melting or burning off the film.

According to a third aspect of the invention, there is provided a method of manufacturing a ceramic honeycomb structure, wherein preferably a transparent or translucent film is used and the positions to be irradiated with the high-density energy beam are determined based on the positional information of the cell ends acquired by an image processing means for recognizing the positions of the cell ends visually through the film attached to the end surface of the honeycomb structure body. Even in the case where the ceramic honeycomb structure body is unavoidably deformed in the course of manufacture, the positions of the cell ends can be determined accurately by the image processing means, and the positions to be irradiated with the high-density energy beam can be determined based on the positions of the cell ends thus determined. In this way, the accuracy of the step of forming the through holes can be improved and the automation of the same step can be promoted.

According to a fourth aspect of the invention, there is provided a method of manufacturing a ceramic honeycomb structure, wherein the high-density energy beam is preferably a laser beam. In such a case, the light having a calorific value required for melting or burning off the film can be easily and accurately obtained. Also, fine adjustment is easy. The laser beam may be a $CO_2$ laser beam, a YAG laser beam or any other laser beam generated from any laser source.

According to a fifth aspect of the invention, there is provided a method of manufacturing a ceramic honeycomb structure in which some of the cell ends located on the end surfaces of the ceramic honeycomb structure are closed, comprising the steps of:

preparing a honeycomb structure body with all the cell ends open on the end surfaces;

attaching a transparent or translucent resin film in such a manner as to cover one of the end surfaces of the honeycomb structure body;

forming through holes by thermally melting or burning off the resin film portions located at the cell ends to be closed;

placing the honeycomb structure body on a base with the end surface having the resin film attached thereto up and the other end surface down;

charging the masking powder by way of the through holes of the resin film and depositing the masking powder at the cell ends of the other end surface;

forming mask portions by hardening the deposited masking powder;

impregnating each end surface with a slurry containing an end surface closing material, and causing the slurry to enter the cell ends by way of the through holes at the end surface having the resin film attached thereto, and by way of openings lacking the mask portions at the end surface having the mask portions; and hardening the slurry while at the same time removing the resin film and the mask portions.

The most noticeable point of this aspect of the invention is that the process for masking the two end surfaces of the honeycomb structure is carried out in such a manner that a resin film is attached to one of the end surfaces and used as a masking member formed with through holes for one of the end surfaces while a masking member formed with the mask portions using the masking powder is used for the other end surface.

A film made of resin that can be thermally melted or burned is used as the aforementioned resin film. For example, a film made of a thermoplastic synthetic resin can be used. Also, the resin film is attached by any of various methods including a method using an adhesive film making up a resin film coated with an adhesive in advance, a method in which an adhesive is coated on a honeycomb structure body or a resin film at the time of attaching and a method in which a resin film is welded without using an adhesive.

The masking powder that can be hardened after being deposited on the cell ends is used. The hardening can be accomplished by any of various methods including a method in which a part or the whole of the powder is melted with heat and solidified, and a method in which adjacent powder particles are joined by chemical reaction.

The slurry containing the end surface closing material can be hardened by drying or baking or by any of various other methods of hardening.

The step of causing the slurry to enter the cell ends can be carried out either before or after baking the honeycomb structure body. According to whether this step is carried out before or after baking the honeycomb structure body, the composition and the hardening method of the slurry is preferably changed.

In this aspect of the invention, the step of masking the end surfaces of the honeycomb structure body includes the substep of attaching the resin film to one of the end surfaces and forming through holes by melting or burning off the desired portions of the resin film. As a result, one of the end surfaces is masked with the resin film.

The through holes are formed in the resin film by radiating a high density energy beam on the resin film and thereby melting or burning off the film. The film can be melted or burned off instantaneously by the heat transmitted from the high-density energy beam and the through holes can be easily formed. Further, the position of radiation of the high-density energy beam can be controlled with so high a precision that the positions of the through holes can be controlled accurately and the automation can be accomplished with comparative ease.

Then, the other end surface is masked using the method of masking the resin film described above. Specifically, as described above, the honeycomb structure body is placed on a base with the end surface having the resin film attached thereto up and the other end surface down. As a result, the cell ends of the other end facing down are closed by the base. Under this condition, the masking powder is charged by way of the through holes of the resin film. The masking powder is deposited on the cell ends of the other end surface. Then, the masking powder thus deposited is hardened to form mask portions.

After that, the two end surfaces are impregnated with a slurry containing an end surface closing material. Thus, the slurry enters the cell ends by way of the through holes at the end surface having the resin film attached thereto. Also, the slurry enters the cell ends of the end surface having the mask portions through openings lacking the mask portions.

By hardening the slurry while at the same time removing the resin film and the mask portions, the desired ceramic honeycomb structure is obtained.

The resin film and the mask portions can be removed finally by burning, for example. In such a case, the removing work is very easy. For removing the resin film or the like, heat may be applied at the same time as, or independently of, the process, if any, of drying or baking the slurry.

Also, the resin film and the mask portions can be separated mechanically instead of by burning.

Now, the operation and the effects of this aspect of the invention will be explained.

In this aspect of the invention, the step of masking the two end surfaces of the honeycomb structure body requires, unlike in the prior art, no work for filling the wax and scraping out a part of the was. Specifically, on one end surface, the through holes can be formed simply by heating the portions of the resin film to be formed with the through holes and nothing is required to be removed for a greatly simplified process. On the other end surface, the masking powder can be charged easily only at the places requiring the masking utilizing the resin film, and therefore the mask portions can be very easily formed.

As a result, the masking process can be remarkably improved over the prior art by reducing the working time, the number of steps and the production cost.

Also, in this aspect of the invention, the process for forming the through holes in the resin film can be automated using a machine for further improving the working efficiency.

Further, the masking powder is charged accurately at intended positions by way of the through holes of the resin film without erroneously masking the two ends of a given cell. Thus, a honeycomb structure of high quality can be produced.

This aspect of the invention can thus provide a method of manufacturing a honeycomb structure in which the process for closing a part of the cell ends of the end surfaces of the honeycomb structure is improved.

The resin film used in this aspect of the invention may be either a natural material such as cellophane, or a synthetic material such as PET (polyethylene terephthlate), PP (polypropylene) or polyester.

According to a sixth aspect of the invention, there is provided a method of manufacturing a ceramic honeycomb structure, wherein the positions to be irradiated with the high-density energy beam are determined preferably based on the positional information of the cell ends acquired by use of image processing means for recognizing the positions of the cell ends visually through the resin film attached to the end surfaces. Even in the case where the ceramic honeycomb structure body is unavoidably deformed in the course of manufacture, the positions of the cell ends can be accurately determined by the image processing means and the positions to be irradiated with the high-density energy beam can be determined based on the positions of the cell ends thus determined. Therefore, both the accuracy of the step of forming the through holes is improved and automation can be promoted at the same time.

According to a seventh aspect of the invention, there is provided a method of manufacturing a ceramic honeycomb structure, wherein the high-density energy beam is preferably a laser beam. In such a case, a light having a calorific value required for melting or burning off the film can be easily and accurately obtained. Also, fine adjustment is easy. The laser beam may be a $CO_2$ laser beam, a YAG laser beam or any of other laser beam generated from any laser source.

According to an eighth aspect of the invention, there is provided a method of manufacturing a ceramic honeycomb structure, wherein the masking powder preferably contains thermosetting resin powder. In such a case, the thermosetting resin powder can be hardened after depositing the masking powder on the cell ends of the other end surface. In this way, the mask portions can be easily formed by hardening the masking powder.

The thermosetting resin powder may be epoxy resin, phenol, melamine, etc.

According to a ninth aspect of the invention, there is provided a method of manufacturing a ceramic honeycomb structure, wherein the masking powder preferably contains resin powder having a different melting point from the thermosetting resin powder. In such a case, during the process of hardening the masking powder, one type of resin powder (the thermosetting resin powder or the resin powder having a different melting point) is melted while the other type of resin powder maintains a solid state. As a result, the solid resin powder is distributed uniformly for an improved uniformity of the mask portions.

The aforementioned resin powder having a different melting point may be either thermosetting resin powder or thermoplastic resin powder. The thermoplastic resin powder may be polyethylene powder, polypropylene or polystyrene.

According to a tenth aspect of the invention, there is provided a method of manufacturing a ceramic honeycomb structure, wherein the masking powder preferably contains a foaming agent. In such a case, a space can be formed by roaming between the particles of the thermosetting resin particles at the time of hardening the masking powder, and gaps which otherwise might exist around each masking portion be completely eliminated by expanding the volume of the masking portions. A specific example of the foaming agent is Microsphere (trade name).

According to an 11th aspect of the invention, there is provided a method of manufacturing a ceramic honeycomb structure, wherein the masking powder preferably contains a fluidity improver for improving the fluidity at the time of charging the masking powder. In such a case, the masking powder that has been charged can be deposited with a comparatively high density, thereby making it easy to acquire high compaction at the subsequent time of hardening. A specific example of the fluidity improver is a surface active agent having a surface lubrication effect or a surface active agent having a function to prevent surface charging.

According to a 12th aspect of the invention, there is provided a through hole forming device for forming through holes at the desired positions of the cell ends in a transparent or translucent film attached to cover at least a part of the open cell ends at an end surface of a honeycomb structure, the device comprising image processing means for acquiring the positional information by recognizing the positions of the cell ends visually through the film attached to the end surface, heat radiation means for radiating a high-density energy beam on the film, and control means for determining the positions of the high-density energy beam radiation based on the positional information output from the image processing means and thereby operating the heat radiation means.

With the through hole forming device according to this aspect of the invention, the high-density energy beam can be accurately radiated according to the positional information of the cell ends acquired by the image processing means. By use of this through hole forming device, therefore, the step of closing a part of the cell ends can be remarkably improved over the prior art in manufacturing the honey comb structure.

According to a 13th aspect of the invention, there is provided a through hole forming device, wherein the high-density energy beam is preferably a laser beam as in the aforementioned case.

According to a 14th aspect of the invention, there is provided a method of manufacturing a ceramic honeycomb structure with a part of the cell ends at an end surface of the ceramic honeycomb structure closed, wherein the process for closing a part of the cell ends of an end surface of a honeycomb structure body produced with the cell ends open to the end surface includes the steps of:

acquiring the positional information on the cell ends using an image processing means for recognizing the positions of the cell ends;

attaching a film to the end surface of the honeycomb structure body in such a manner as to cover at least a part of the cell ends;

forming through holes by thermally melting or burning off the portions of the film located at the cell ends to be closed based on the positional information;

dipping the end surface in a slurry containing an end surface closing material and causing the slurry to enter the cell ends by way of the through holes; and hardening the slurry while at the same time removing the film.

In the method in this aspect of the invention, the positional information on the cell ends at an end surface is acquired before attaching the film to the end surface. After attaching the film to the end surface, through holes are formed in the film in accordance with the acquired positional information. No film covers the cell ends at the time of acquiring the positional information on the cell ends, and therefore very clear image data and very accurate positional information can be acquired. Also, in view of the fact that the film can be attached subsequently, the film is not required to be transparent or translucent and an opaque film may be used.

According to a 15th aspect of the invention, there is provided a method of manufacturing a ceramic honeycomb structure with a part of the cell ends at an end surface thereof closed, wherein the process of closing a part of the cell ends at an end surface of the honeycomb structure produced with open cell ends at the end surface includes the steps of acquiring the positional information on the cell ends using an image processing means for recognizing the positions of the cell ends, forming through holes by thermally melting or burning off, based on the positional information, predetermined portions of the film prepared to cover at least a part of the cell ends and located at the cell ends to be closed, attaching a film on the end surface of the honeycomb structure, locating the through holes at the cell ends to be closed, dipping the end surface in a slurry containing an end surface closing material, and hardening the slurry while at the same time removing the film.

In this aspect of the invention, the positional information on the cell ends of an end surface is acquired before attaching the film on the particular end surface. Further, before attaching the film on the end surface, the through holes are formed in the film based on the positional information. In this case, therefore, the process for forming through holes in the film can be carried out for the film separately. Thus, the possibility is eliminated of affecting the honeycomb structure body or the other end surface thereof at the time of forming the through holes, thereby improving the workability of manufacturing a ceramic honeycomb structure.

According to a 16th aspect of the invention, there is provided a method of manufacturing a ceramic honeycomb structure, wherein the through holes of the film are preferably formed by radiating a high-density energy beam on the film and thereby melting or burning off the film. As a result, the positions where the through holes are formed can be accurately controlled as in the foregoing case. Also, the process of forming the through holes can be automated with comparative ease.

According to a 17th aspect of the invention, there is provided a method of manufacturing a ceramic honeycomb structure, wherein the high-density energy beam is preferably a laser beam. In this case, the positions to be radiated with the laser beam and the calorific value thereof can be controlled with high precision, and therefore the accuracy of forming the through holes can be improved.

According to an 18th aspect of the invention, there is provided a method of manufacturing a ceramic honeycomb structure, wherein the through holes can be formed in the film by bringing a heated jig into contact with the film and melting or burning off the film. In such a cage, a comparatively simple device such as a jig having a function similar to a soldering iron as compared with the high-density energy radiator can be used, while at the same time reducing the equipment cost.

According to a 19th aspect of the invention, there is provided a method of manufacturing a ceramic honeycomb structure, wherein the size of each through hole formed in the film attached to the cell ends is preferably changed in accordance with the opening area of the cell ends. Specifically, the opening area of the cell ends open to the end surfaces of the honeycomb structure body is not necessarily the same but is somewhat varied from one cell end to another. Especially, the cell ends in contact with the outer peripheral edge of the end surface often have a smaller opening area. In the case where the opening areas are varied as described above, the size of each through hole is changed in accordance with the opening area thereof. Specifically, a large through hole is formed for a large opening area, and vice versa. As a result, an appropriate amount of slurry can be caused to enter in accordance with the opening area and the variation of the thickness between the closed portions can be reduced.

The opening area and the size of the through holes may be proportional to each other. Also, the value of the opening area may be segmented into predetermined ranges thereby to form groups, for each of which the size of the through hole is determined by setting a constant value. Other methods can also be used.

According to a 20th aspect of the invention, there is provided a method of manufacturing a ceramic honeycomb structure, wherein the through holes are preferably formed substantially in a circle about the center of gravity of the opening area of each cell end. In such a case, an unbalanced arrangement of the slurry which enters by way of the through holes can be suppressed in the subsequent steps.

According to a 21st aspect of the invention, there is provided a method of manufacturing a ceramic honeycomb structure, wherein the film may be a resin film or a wax sheet. The resin film may be made of a thermoplastic synthetic resin, for example, as described above. The wax sheet, on the other hand, may be made of the wax of paraffin group.

According to a 22nd aspect of the invention, there is provided a method of manufacturing a ceramic honeycomb structure, wherein the through holes are preferably formed using a high-density energy beam in such a manner that the high-density energy beam is radiated first at the center of each through hole to be formed and the diameter of the through hole is increased progressively to the desired size while changing the position of radiation spirally.

In this case, the through holes can be formed beautifully without any remainder of the film removed. Also, a high-density energy beam radiated in this case has a comparatively low energy density and has a smaller diameter than the desired through holes. As a result, the high-density energy beam is prevented from reaching the other end through the cell. Thus, the film which may have already been attached to the other end is prevented from being damaged.

According to a 23rd aspect of the invention, there is provided a method of manufacturing a ceramic honeycomb structure, wherein the through holes are formed preferably in such a manner that the position of radiation of the high-density energy beam is fixed while the honeycomb structure body is moved to radiate the high-density energy beam at the desired position. In radiating the high-density energy beam, the high-density energy beam radiator and/or the honeycomb structure body is required to be moved relatively to each other or to the other, as the case may be.

In such a case, the device for radiating the high-density energy beam which has a very high precision is always heavier than the honeycomb structure body. Therefore, the use of a device for moving the honeycomb structure body rather than the use of the device for moving the high-density energy beam can contribute to a lower equipment cost and an improved device stability.

According to a 24th aspect of the invention, there is provided a method of manufacturing a ceramic honeycomb structure, wherein the image processing means preferably produces the positional information of the cell ends in such a manner that the end surface of the honeycomb structure body is segmented into a plurality of blocks for each of which the image data for the area including the particular block and an area duplicated with at least a part of an adjacent block is collected for each block, and the image data for all the blocks are coupled to each other by superposing the duplicated areas thereby to produce the positional information on the cell ends for the entire surface end.

In this case, each unit of the image data collected by the image processing means can be reduced by segmentation into the blocks. As a result, the accuracy of each image data can be improved. Also, each image data is collected in such a manner as to include the data on a portion duplicated with an adjacent block as described above. As a result, the image data for the whole end surface of the honeycomb structure body can be accurately formed by superposing the duplicated portions, thereby making it possible to acquire accurate positional information for each cell end.

According to a 25th aspect of the invention, there is provided a method of manufacturing a ceramic honeycomb structure, wherein the image processing means preferably collects the image data using a set of cameras fixed in position while the honeycomb structure body is moved to locate each of the blocks sequentially within the range of visual field of the cameras.

In collecting the image data of each block, the camera and the honeycomb structure body are required to be moved relatively to each other. In such a case, the equipment cost can be reduced and the device stability improved more by rendering the honeycomb structure body movable than by rendering the device including the very precise camera movable. Also, the honeycomb structure body may be moved between a fixed high-density energy beam source and a fixed camera unit. In such a case, a plurality of steps can be automated easily.

According to a 26th aspect of the invention, there is provided a method of manufacturing a ceramic honeycomb structure, wherein the through holes are preferably formed for each block, and in the presence of a block distant from any adjacent block immediately after completely forming the through holes for a given block, the through holes are preferably formed for the distant block. As a result, the deformation due to the thermal distortion of the film can be suppressed more than when adjacent blocks are continuously processed.

Embodiment 1

A method of manufacturing a ceramic honeycomb structure according to an embodiment of the present invention will be explained with reference to FIGS. 1 to 4.

Figure 14A:
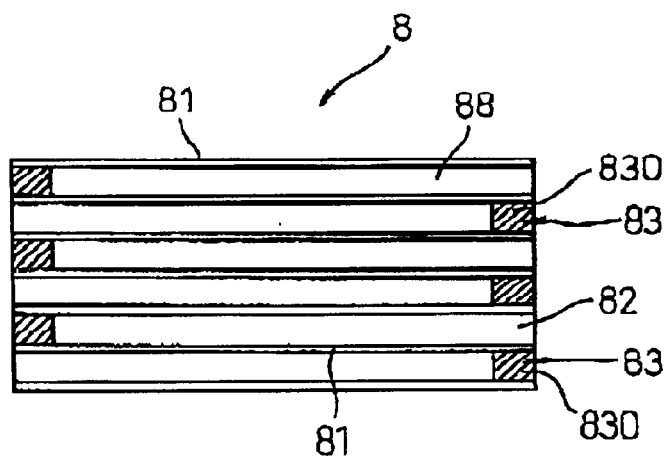
Figure 14B:
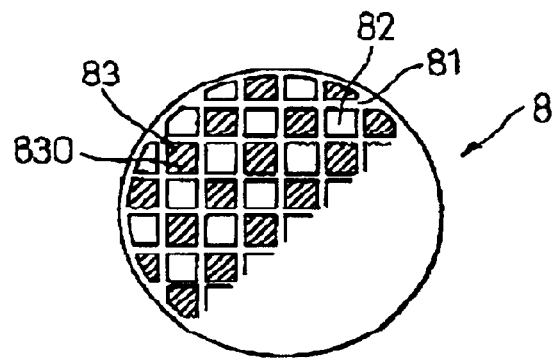

According to this embodiment, as shown in FIG. 14, there is provided a method of manufacturing a ceramic honeycomb structure 8 with some of the cell ends at an end surface thereof closed for the carrier of an exhaust gas purifier of an automotive vehicle.

Figure 2:
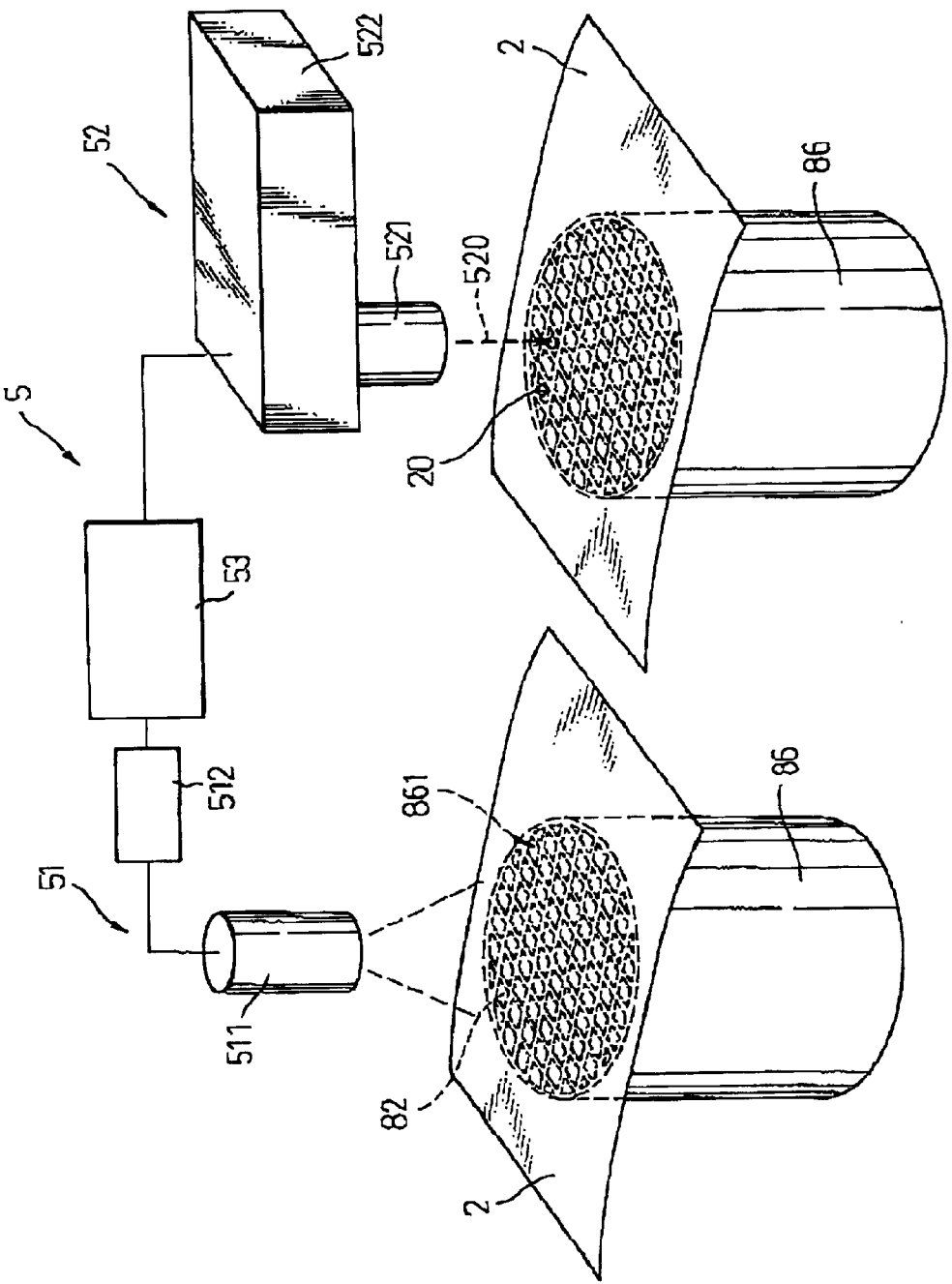
FIG. 2 is a diagram for explaining the step of forming through holes according to the first embodiment.
Figure 4:
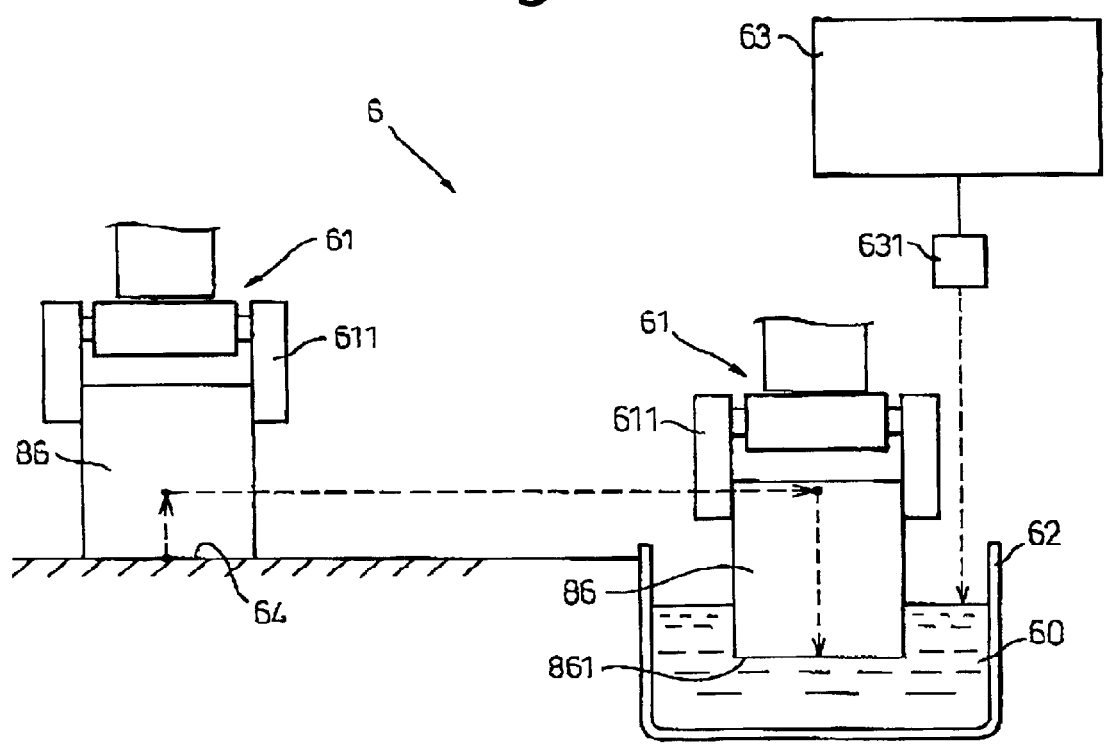
FIG. 4 is a diagram for explaining the step of dipping in a slurry according to the first embodiment.

As shown in FIG. 1, after fabricating a honeycomb structure body 86 with all the cell ends open to an end surface, a part of the cell ends 82 at the end surface of the honeycomb structure body 86 are closed by attaching a transparent or translucent resin film 2 to the end surface 861 of the honeycomb structure body 86 in such a manner as to cover the cell ends 82. Then, as shown in FIG. 2, the portion of the resin film 2 located at the cell ends 82 to be closed is thermally melted or burned off thereby to form through holes 20. As shown in FIG. 4, the end surface 861 is dipped in a slurry 60 containing an end surface closing material, and the slurry 60 is caused to enter the cell ends 82 by way of the through holes 20, after which the slurry 60 is hardened while at the same time removing the resin film 2.

According to this embodiment, the honeycomb structure body 86 has been fabricated by extrusion molding. Specifically, a long cylindrical honeycomb structure having a multiplicity of square cells is fabricated using a ceramic material constituting cordierite and cut off to a predetermined length thereby to form the honeycomb structure body 86. The cell ends 82 of the honeycomb structure body 86 are all open to the two end surfaces 861, 862.

As shown in FIG. 1, a resin film 2 is attached over the entire end surface 861. This embodiment uses a thermoplastic resin film having a total thickness of 110 $\mu$m having one surface thereof coated with an adhesive.

Then, according to this embodiment, the portion of the resin film 2 located on the cell ends 82 to be closed is thermally melted or burned off using a through role forming device 5 thereby to form the through holes 20.

As shown in FIG. 2, the through hole forming device 5 includes image processing means 51 for acquiring positional information by visually recognizing the cell ends 82 through the resin film 2 attached to the end surface 861, heat radiation means 52 for radiating a high-density energy beam (laser beam) 520 on the resin film 2, and control means 53 for determining the position of radiation of the high-density energy beam 520 and operating the heat radiation means 52 based on the positional information supplied from the image processing means 51.

The image processing means 51 includes a camera unit 511 for picking up an image of the end surface, and an image processing unit 512 for forming image data. A plurality of camera units 511 are preferably installed in accordance with the size of the end surface. This embodiment, however, is so configured with a single camera unit 511 which is moved appropriately for sequentially imaging a plurality of areas.

The heat radiation means 52 includes a $CO_2$ laser emitter 521 and a moving unit 522 having built therein a control unit for the $CO_2$ laser emitter 521. A plurality of $CO_2$ laser emitters 521 are preferably installed for an improved efficiency, although this embodiment uses one $CO_2$ laser unit for the reason of equipment cost.

The control means 53 calculates the position and the opening area of each cell end 82 based on the image data received from the image processing means 51, and determines the positions of the through holes 20 by determining the positions of the cell ends 82 to be closed. Also, a contour position 22 (FIG. 3) for cutting off the unrequited surrounding portion of the resin film 2 is determined. The resulting information on the positions of the through holes and the contour position are applied to the heat radiation means 52 for controlling the movement of and the radiation by the $CO_2$ laser emitter 521.

By using the through hole forming device 5 having this configuration, as shown in FIG. 2, the end surface 861 of the honeycomb structure body 86 is first imaged by the camera unit 511 thereby to produce image data. Then, the control means 53 calculates the through hole positions and the contour position. According to this embodiment, the positions where the through holes are to be formed are determined in such a manner as to form the closed portions in a checkerwork form with adjacent cells alternately open and closed.

As the next step, the honeycomb structure is moved to the position under the laser radiation means or the laser radiation means is moved, and the origin is set at the same position on the coordinate with the honeycomb structure located just under the camera unit and the radiation means.

In response to an instruction from the control means 53, the laser beam 520 is radiated sequentially from the $CO_2$ laser emitter 521 and by thus melting or burning off the resin film 2, the through holes 20 and the contour position 22 are formed.

Figure 3:
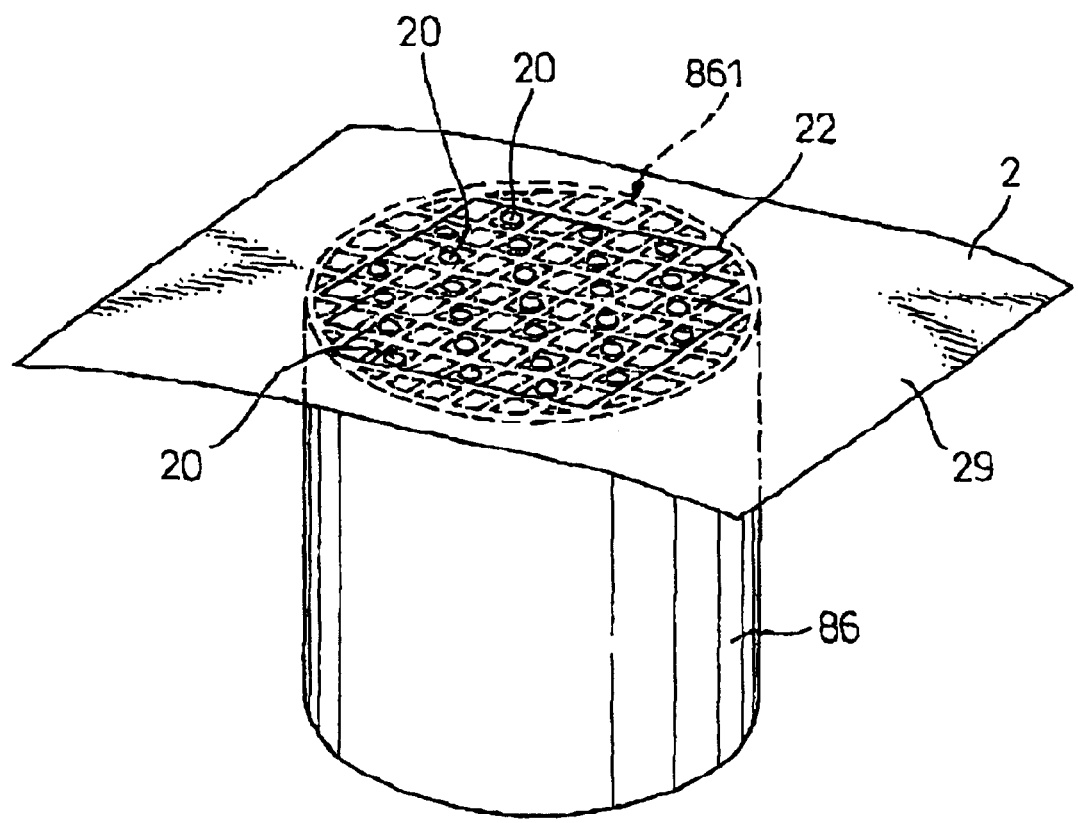
FIG. 3 is a diagram for explaining the state formed with through holes and a contour according to the first embodiment.

As a result, as shown in FIG. 3, the resin film 2 is formed on the end surface of the honeycomb structure body 86 with the unrequited portion 29 outside the periphery of the contour position 22 cut off and the through holes 20 formed at the portion of the resin film 2 located on the cell ends to be closed.

This process including the step of attaching the resin film 2 to the step of forming the through holes is carried out similarly for the other end surface of the honeycomb structure body 86. In the process, one of the ends of each cell is closed by the resin film 2, while the other cell end is formed with a through hole 20.

Each square lacking a part of the periphery thereof is not formed as an open portion in a checkerwork form but is entirely filled with the closing material.

Then, the end surface 861 is dipped in the slurry 60 containing the end surface closing material, and the slurry 60 is caused to enter the cell ends by way of the through holes. In this embodiment, as shown in FIG. 4, a dipper 6 is used. The dipper 6, as shown, includes a handling unit 61 for holding and moving the honeycomb structure body 86 constituting a work, a liquid tank 62 filled with the slurry 60 containing an end surface closing material with a main component to make up cordierite after baking, and a control unit 63 for controlling the handling unit 61. The control unit 63 is connected with a liquid level sensor 631 for detecting the liquid level of the slurry 60.

In conducting the work with the dipper 60, the first step, as shown in FIG. 4, is to place the honeycomb structure body 86 on a base 64 with the end surface to be processed down. Then, the honeycomb structure body 86 is held and lifted to a predetermined height by a clamp 611 of the handling unit 61. The handling unit 61 is moved to move the honeycomb structure body 86 over the slurry 60. Then, the handling unit 61 is lowered to dip the end surface of the honeycomb structure body 86 in the slurry 60.

At the same time, the control unit 63 calculates the dipping depth from the data of the liquid level sensor 631 and the vertical distance covered by the handling unit 61, and controls the handling unit 61 to attain the desired dipping depth.

As a result, the slurry 60 enters the cell ends 82 by way of the through holes 20 at the end surface of the honeycomb structure body 86.

Then, the work using the dipper 6 is repeated in similar fashion for the other end surface of the honeycomb structure body 86.

The honeycomb structure body 86 having the cell ends 82 impregnated with the slurry 60 is dried and baked.

In this way, the slurry 60 is baked and solidified into a closing material 80 thereby to form the closed portions 83, while at the same time burning off the resin film 2 that has thus far been attached to the end surface. The honeycomb structure 8 with some of the cell ends closed can thus be obtained.

Now, the operation and effects of the present embodiment will be explained.

According to this embodiment, as described above, after attaching the resin film 2 to an end surface of the honeycomb structure body 86, the desired portion of the resin film is thermally melted or burned off thereby to form the through holes. Therefore, the work for forming the through holes is very simple as compared with the prior art. Especially in this embodiment, a laser beam 520 constituting a high-density energy beam is radiated on the resin film 2 to form the through holes 20. As a result, the through holes 20 can be formed very easily with high precision.

Further, this embodiment uses a through hole forming device 5 having the image processing means 51 described above. Even with a ceramic honeycomb structure which is unavoidably deformed in the course of manufacture, therefore, the positions of the cell ends of the end surface can be found accurately. Especially in this embodiment, the use of a transparent or translucent resin film makes possible effective utilization of the image processing means.

In this way, the automation of the work of forming the through holes made possible by use of the through hole forming device 5 described above can remarkably improve the efficiency as compared with the conventional manual work.

As described above, according to this embodiment, the process for closing a part of the cell ends at the end surface of the honeycomb structure can be rationalized, so that the productivity of the honeycomb structure with a part of the cell ends closed can be remarkably improved over the prior art.

Embodiment 2

According to the first embodiment described above, the slurry 60 is hardened by baking it at the same time as the honeycomb structure body 86. In the second embodiment, by contrast, the honeycomb structure body 86 is baked before the slurry 60 is caused to enter the cell ends of the honeycomb structure body 86. Also, the slurry 60 is composed of a sealer (such as Sumiceram (trade name)) containing ceramics having such a characteristic that it is hardened, after being charged, by the hardening process of drying in the air for 15 to 20 minutes at room temperature and holding at 110 to 120° C. for one hour.

Also in this case, the operation and effects similar to those of the first embodiment are obtained.

Embodiment 3

Figure 5:
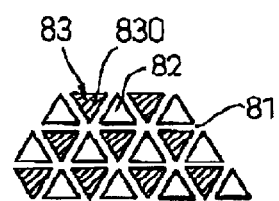
FIG. 5 is a diagram for explaining the cell shape of the honeycomb structure according to a third embodiment of the invention.

This embodiment represents a case in which the shape of the cells of the honeycomb structure body 86 in the first embodiment is changed. Specifically, according to the third embodiment, as shown in FIG. 5, the cells of the honeycomb structure body 86 are triangular, so that all the cell ends 82 have a triangular shape.

Also in this case, the closing members 830 are arranged on a part of the cell ends 82 thereby to form the closed portions 83 by a method similar to the first and second embodiments, and similar effects to the first and second embodiments can be attained.

Further, it is noticeable that the present embodiment can use the same through hole forming device 5 as in the first embodiment. The through hole forming device 5, as described above, can determine the position of radiating the high-density energy beam out of contact by the image processing, and can readily follow the charge in the shape and size of the object to be radiated. As a result, the use of the through hole forming device 5 can produce a plurality of types of honeycomb structure on the same production line, thereby remarkably improving the manufacturing process.

Embodiment 4

Figure 6:
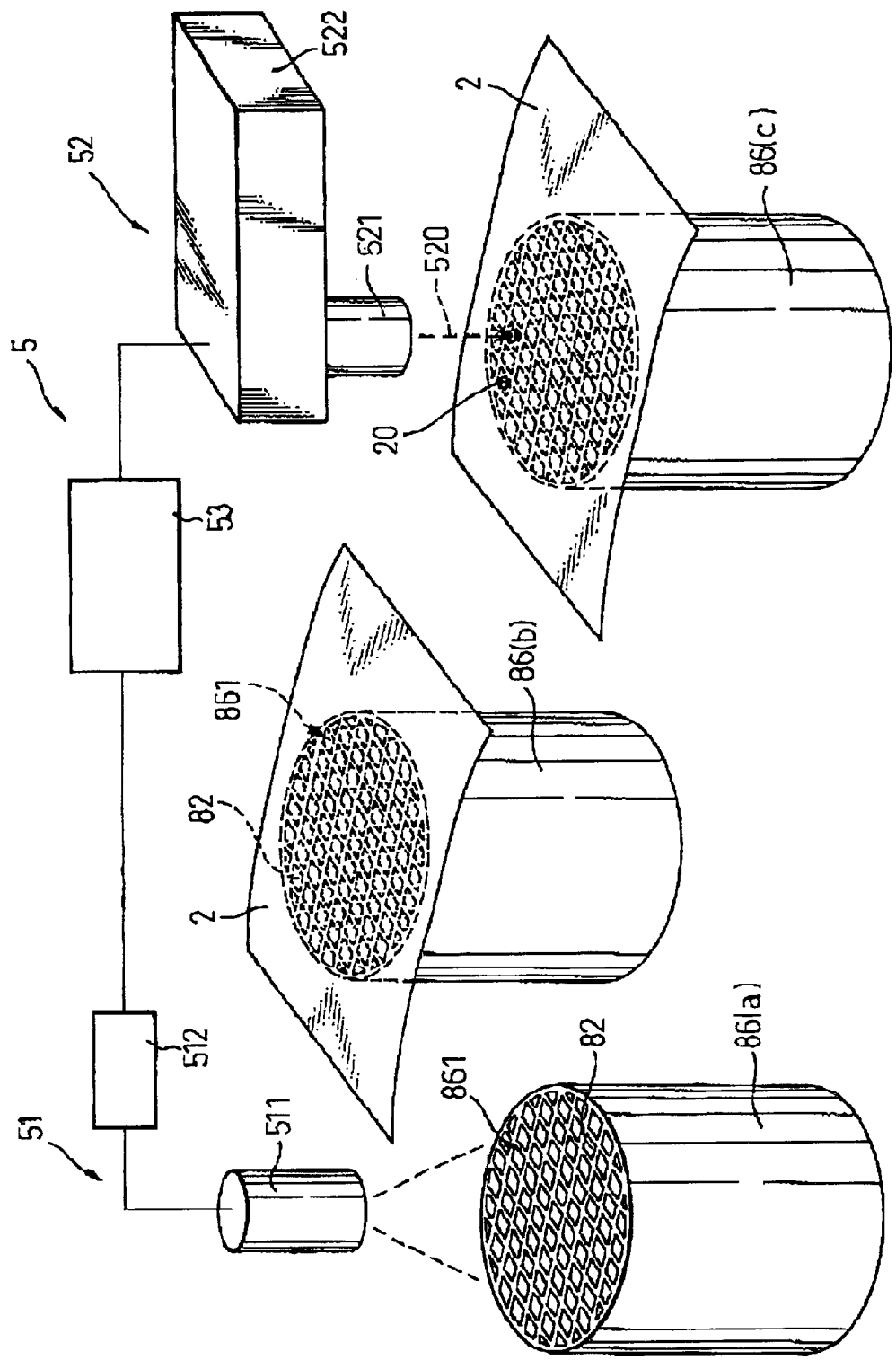
FIG. 6 is a diagram for explaining the steps up to the through hole forming step according to a fourth embodiment of the invention.

As shown in FIG. 6, this embodiment is different from the first embodiment in that, before attaching the resin film 2 to the end surface 861 of the honeycomb structure, the positions of the cell ends 82 at the end surface 861 are recognized and the positional information thereof is produced, after which a laser beam 520 is radiated on the end surface 861 having the resin film 2 attached thereto thereby to form the through holes 20.

This embodiment, as shown in FIG. 6, uses a device having a substantially similar configuration to the through hole forming device 5 shown in the first embodiment. The component parts having the same functions are designated by the same reference numerals, respectively.

According to this embodiment, the image data of the end surface 861 of the honeycomb structure 86(a) are collected using the camera unit 511 of the through hole forming device 5 from above.

The imaging operation of the camera unit 511 is performed with the end surface 861 divided into a plurality of blocks. The image data obtained for the respective blocks are coupled to each other, so that the positional information of the cell ends 82 for the whole end surface 861 is formed in the image processing unit 512.

For taking an image of a plurality of blocks, the camera unit 511 is fixed in position while the honeycomb structure body 86(a) placed on a moving unit not shown is moved.

Then, the moving unit moves the honeycomb structure body 86(a) to the position designated by 86(b) in FIG. 6. The resin film 2 is attached to the end surface 861 of the honeycomb structure body 86(b) in such a manner as to cover the whole of the cell ends 82. According to this embodiment, the same film is used as in the first embodiment. This film is not necessarily transparent and can be replaced with a different material.

Also, the whole of the end surface 861 is not necessarily covered by a single film, but a plurality of films may be combined. Depending on the specification of the honeycomb structure to be produced, not the whole but only a part of the end surface 861 may be covered.

Then, the honeycomb structure body 86(b) is moved to the position 86(c) by the moving unit. In moving the honeycomb structure 86, the origin of the position coordinate with the honeycomb structure 86 located just under the $CO_2$ laser emitter 521 of the heat radiation means 52 is set to coincide with the origin of the position coordinate with the honeycomb structure 86 located just under the camera unit 511.

In forming the through holes 20, as in the first embodiment, the position at which the laser beam 520 is to be radiated and the size of each through hole 20 are determined by calculation in the control means 53 based on the image data received from the image processing means 51.

According to this embodiment, the size of each through hole 20 is changed in accordance with the opening area of the corresponding cell end to be closed.

Specifically, as shown in Table 1, a matrix of the cell end opening area and the through hole size is prepared, and the diameter of each through hole is determined in accordance with this matrix.

TABLE 1

| Opening area of cell end (mm$^2$) | Diameter of through hole (mm$\phi$) |
|---|---|
| not more than 0.64 | 0.6 |
| 0.64–1.0 | 0.8 |
| 1.0–1.4 | 1 |
| 1.4–1.96 | 1.2 |
| 1.96–2.56 | 1.4 |

The laser beam 520 is radiated so that the through holes 20 are formed one by one sequentially.

In forming a given through hole 20, the laser beam 520 is first applied to the center of the particular prospective through hole 20, and then the position of radiation is spirally displaced relatively to increase the diameter of the through hole gradually to the desired size. In this way, a substantially circular through hole 20 is formed about the center of gravity of the opening area of each cell end.

The through holes 20 are formed following this procedure, and therefore the diameter of the laser beam 520 is desirably as small as possible. According to this embodiment, the diameter of the laser beam 520 is 0.1 mm$\phi$. Also, the intensity of the laser beam 520 is preferably the required minimum to burn the resin film 2. According to this embodiment, the output is set to 3 to 5 W.

In the process, the laser beam 520 is radiated on the desired position by fixing the position at which the high-density energy beam is radiated while moving the honeycomb structure body 86(c) by the moving unit.

Then, through holes 20 are similarly formed on the other end surface of the honeycomb structure body 86. After that, the process of causing the slurry into the cell ends, drying and baking are conducted as in the first embodiment.

According to this embodiment, the cell ends 86 can be directly viewed when acquiring the positional information of the cell ends 86 by the imaging processing means described above As compared with the first embodiment in which the image is taken through the resin film 2, therefore, accurate data can be obtained. As a result, the the positions where the through holes 20 are formed can be calculated with higher accuracy.

According to this embodiment, as described above, the size of each through hole 20 is changed in accordance with the opening area of the corresponding cell end 82. As a result, an appropriate amount of slurry can be applied in accordance with the opening area of each cell end 82, thereby making it possible to reduce the thickness variation of the closed portions 83.

Further, each through hole 20 is formed in a circle by radiating the laser beam 520 first about the center of gravity of the opening area of the prospective cell end, and therefore, the slurry can be introduced evenly without imbalance.

Also, the laser beam 520 is applied first at the center of the prospective through hole 20, and then the position of radiation is spirally displaced relatively in such a manner as to increase the diameter of the through hole 20 gradually to the desired size. By doing so, the resin film 2 that has thus far existed in the through hole 20 can be positively burned off without any remainder.

Furthermore, according to this embodiment, the positions of the camera unit 51 and the $CO_2$ laser emitter 521 are fixed, while the honeycomb structure body 86 is relatively moved by a moving unit not shown. In this way, both the equipment cost of the whole system is reduced and the stability is improved at the same time.

The other points produce the same effects as in the first embodiment.

Embodiment 5

Figure 7:
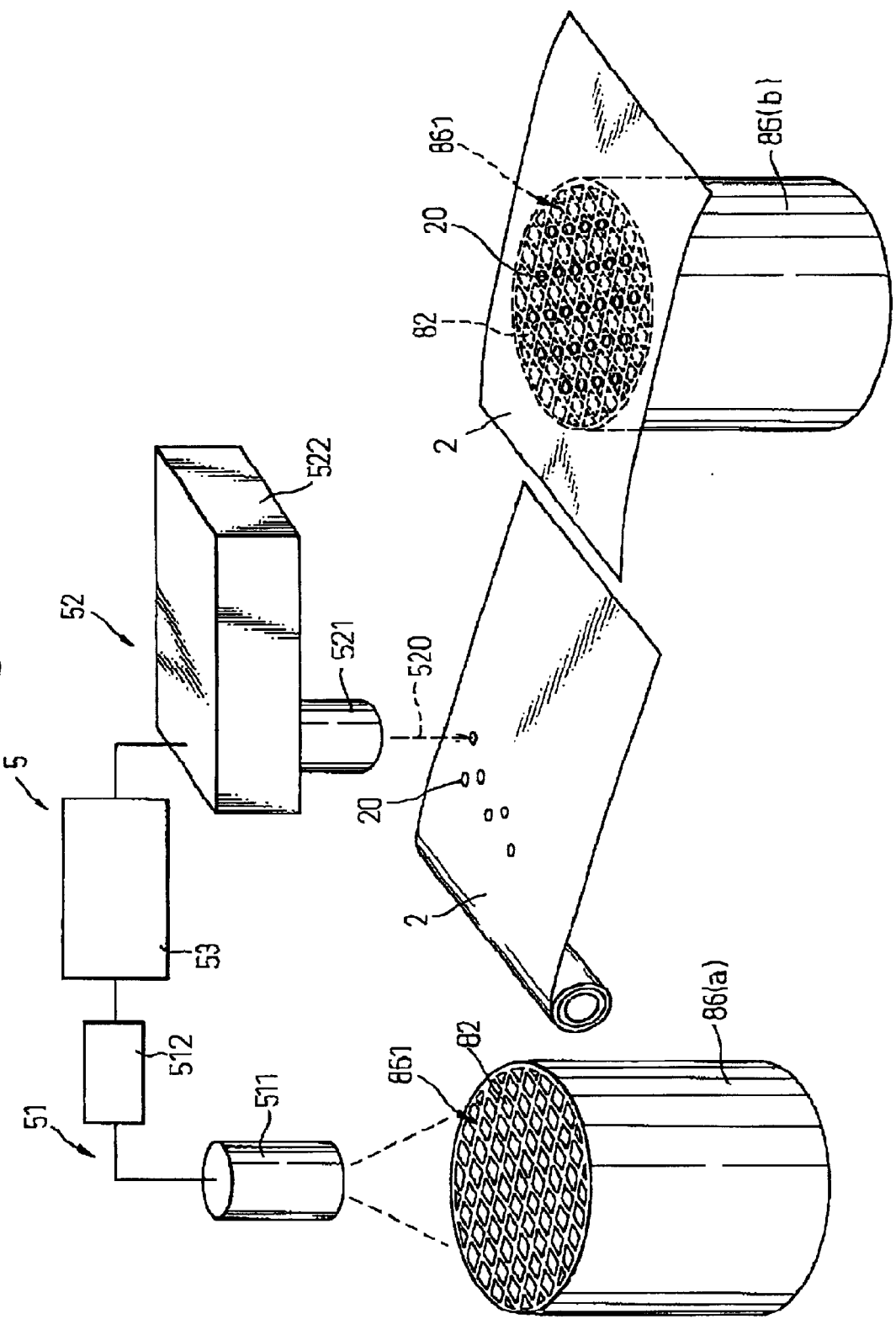
FIG. 7 is a diagram for explaining the steps up to the through hole forming step according to a fifth embodiment of the invention.

This embodiment is different from the first and fourth embodiments in that, as shown in FIG. 7, before attaching the resin film 2 to the end surface 861 of the honeycomb structure, the positions of the cell ends 82 of the end surface 861 are recognized to produce the positional information thereof, after which the through holes 20 are formed in the resin film. Then, the resin film is attached to the end surface 861 of the honeycomb structure.

As shown in FIG. 7, this embodiment also uses a through hole forming device 5 having a substantially similar configuration to the through hole forming device 5 shown in the first embodiment. The component parts having the same functions as the corresponding component parts of the fourth embodiment are designated by the same reference numerals, respectively.

In this embodiment, as in the fourth embodiment, the first step is to acquire the positional information of all the cell ends using the image processing means 51 of the through hole forming device 5.

Then, according to this embodiment, as shown in FIG. 7, the resin film 2, in a roll, is extended horizontally and irradiated with the laser beam 520 emitted from the $CO_2$ laser emitter 521 thereby to form the through holes 20. In the process, the relative movement of the $CO_2$ laser emitter 521 and the resin film 2 is accomplished by moving the $CO_2$ laser beam emitter 521 while keeping the resin film 2 fixed in position.

Also, the origin of the position coordinate with the honeycomb structure 86 located just under the camera unit 511 is set to coincide, at the optimal position, with the origin of the position coordinate with the resin film 2 extended horizontally.

As the next step, according to this embodiment, the resin film 2 formed with the through holes 20 is cut to a predetermined length and manually attached to the end surface 861 of the honeycomb structure body 86. After that, the extraneous portion of the resin film 2 is cut off. This job is carried out also for the other end surface of the honeycomb structure body 86. The other points are similar to the corresponding points in the fourth embodiment.

According to this embodiment, the through holes 20 are formed in the resin film 2 as an independent entity. As a result, there is no fear of radiating the laser beam 520 on the honeycomb structure body 86 or burning the resin film 2 already arranged at the other end. Thus, the work for forming the through holes 20 can be easily conducted.

The other operations and effects are similar to the corresponding ones of the fourth embodiment.

Embodiment 6

This embodiment represents a method of processing the image data of the image processing means 52 in the first, fourth and fifth embodiments.

Figure 8:
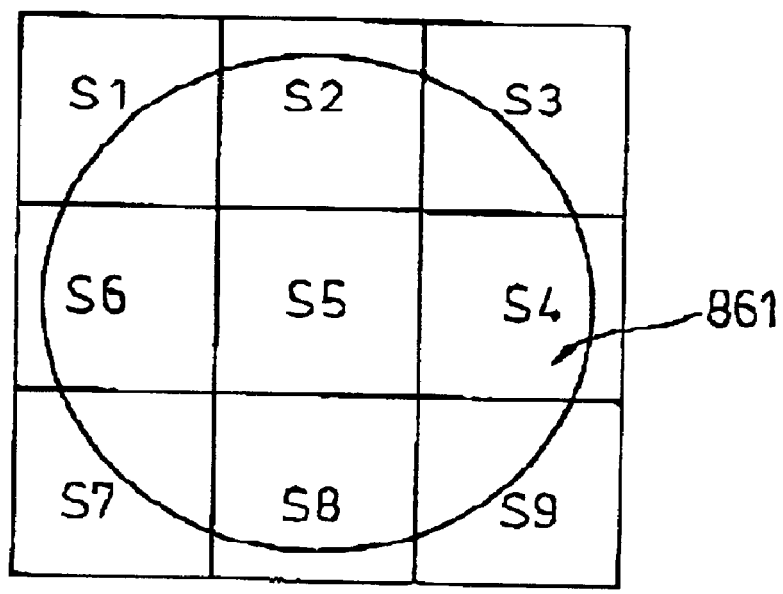
FIG. 8 is a diagram for explaining the division into blocks according to a sixth embodiment of the invention.
Figure 9:
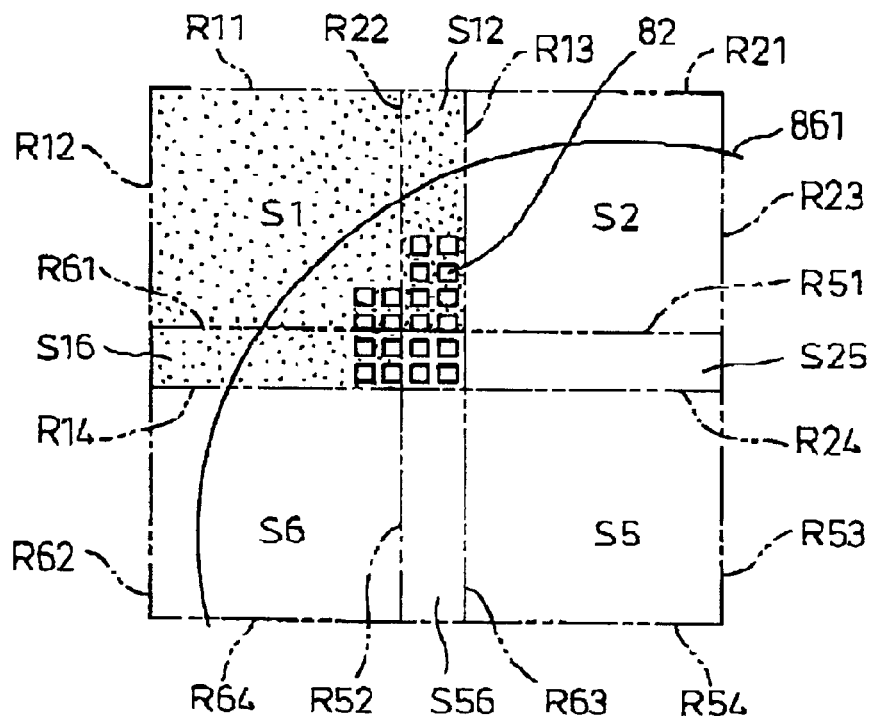
FIG. 9 is a diagram for explaining the area of a block S1 according to the sixth embodiment.
Figure 10:
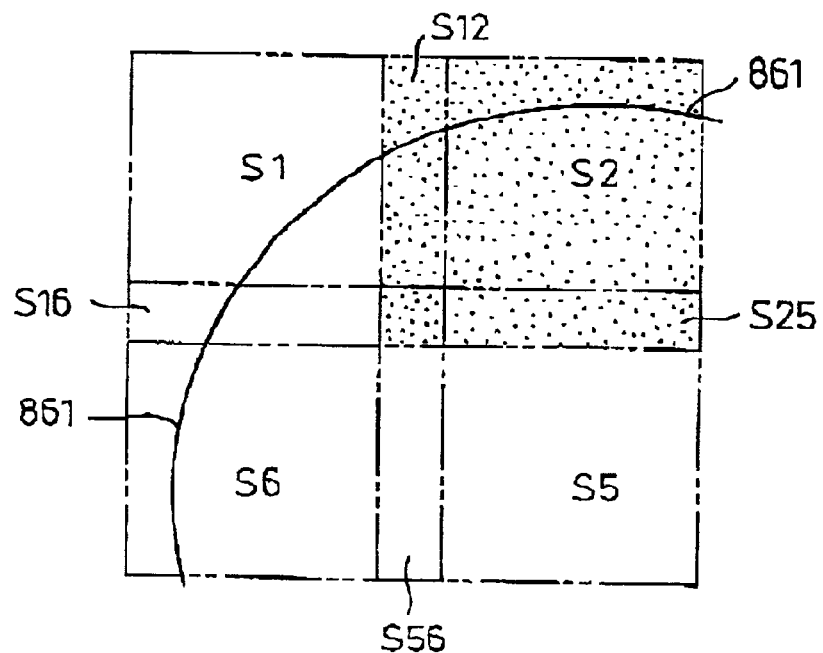
FIG. 10 is a diagram for explaining the area of a block S2 according to the sixth embodiment.

According to this embodiment, as shown in FIG. 8, the positional information of the cell ends 82 is produced in the image processing means 51 by segmenting the area including the end surface 861 of the honeycomb structure body 86 into blocks S1 to S9. As shown in FIGS. 9 and 10, image data for the area including the portion duplicated with at least a part of an adjacent block are collected for each block.

Specifically, as shown in FIG. 9, the contour of the block S1 is rectangular in shape and is defined by the boundaries of R11 to R14. The contour of the block S2, on the other hand, is also rectangular in shape and defined by the boundary lines R21 to R24. In similar fashion, the contour of the block Sn is rectangular in shape and defined by the boundary lines Rn1 to Rn4.

As a result, the boundary between adjacent blocks always has a duplicated portion of the two adjacent blocks. The boundary between blocks S1 and S2, for example, has a duplicated portion S12 which belongs to both blocks S1 and S2. Similarly, the boundary between blocks S1 and S6 has a duplicated portion S16 which belongs to both blocks S1 and S6. When collecting the image data of block S1, therefore, as shown in FIG. 9, the image data including the duplicated portions S12 and S16 is collected.

As shown in FIG. 10, the image data of the block S2 is collected also from the duplicated portions S12, S25 between the blocks S1 and S5 and the portion duplicated with the block S3 not shown.

In similar fashion, the image data of other blocks S3 to S9 are collected also from the portions duplicated with adjacent blocks.

As the next step, the image processing unit 512 couples the image data of the blocks S1 to S9 by superposing the duplicated portions thereof, and thus produces the positional information of the cell ends for the whole end surface. In the process, each image data is set in position by precisely superposing the images of the same cell ends 82 existing in the duplicated portions. For this purpose, various methods are employed based on specific algorithms.

By employing this method of collecting the image data, positional information very high in accuracy can be obtained.

Specifically, the image data obtained from a single camera is such that the portions distant from the center thereof are viewed from a diagonal direction. Therefore, the narrower the visual field, the more accurate the information obtained. Also, the cells of the honeycomb structure are so small in size and the grasping of the area thereof is so important that image data of very high accuracy is required.

For this reason, a plurality of image data each collected from a comparatively small visual field can be effectively combined.

According to this embodiment, in particular, the accuracy by which the image data are coupled with each other can be improved by producing the image data including the duplicated portions as described above. As a result, the positional information of the cell ends 82 for the whole end surface of the honeycomb structure body can be grasped very accurately.

Embodiment 7

A method of manufacturing a ceramic honeycomb structure according to a seventh embodiment of the invention will be explained with reference to FIGS. 3, 4, 6, 11(*a*) to 11(*d*), 12 and 13.

In this embodiment, as shown in FIGS. 14(*a*) and 14(*b*), there is provided a method of producing a ceramic honeycomb structure 8 for the carrier of an exhaust gas purification system of an automotive vehicle, which honeycomb structure 8 has all the cell ends of the end surfaces thereof closed.

Figure 11:
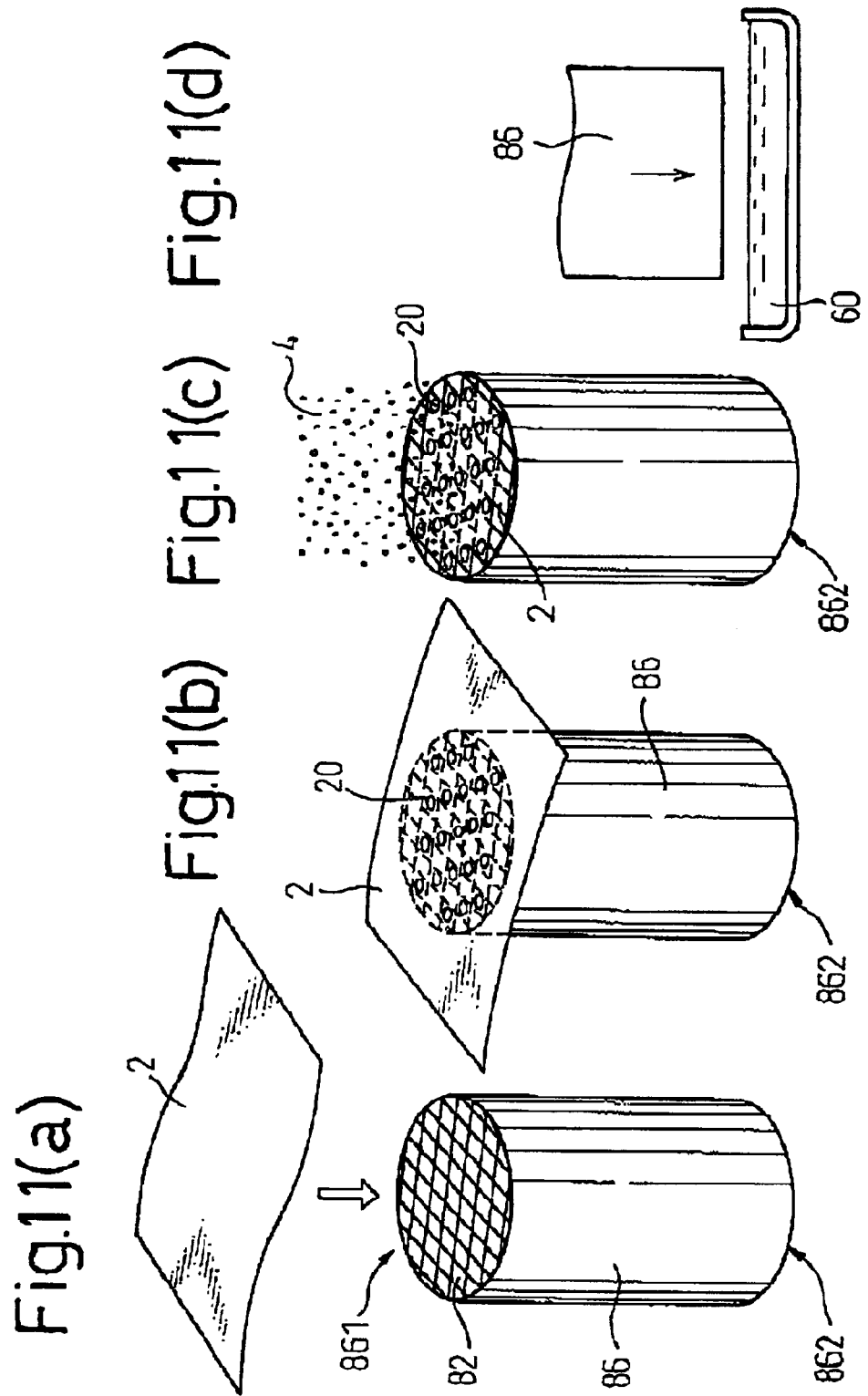

According to this embodiment, as shown in FIG. 11(*a*), a honeycomb structure body 86 is produced with all the cell ends 82 open to the two end surfaces thereof.

Also, as shown in FIG. 11(*a*), a transparent resin film 2 is attached in such a manner as to cover one end surface 861 of the honeycomb structure body 86. Then, as shown in FIG. 11(*b*), the portions of the resin film 2 corresponding to the cell ends 82 to be closed are melted or burned off by being irradiated with a high-density energy beam thereby to form the through holes 20.

As the next step, as shown in FIG. 11(*c*), the honeycomb structure body is placed on a base 49 (FIG. 12) with the end surface 861 having the resin film 20 attached thereto facing up, and the other end surface 862 thereof facing down. Then, the masking powder 4 is charged by way of the through holes 20 of the resin film 2 and deposited on the cell ends of the other end surface 862. The masking powder 4 thus deposited is hardened to thereby form masked portions 40.

After that, the end surfaces 861, 862 are dipped in the slurry 60 containing an end surface closing material. Thus, the slurry 60 is caused to enter the cell ends 82 by way of the through holes 20 for the end surface with the resin film 2 attached thereto, and through the openings lacking the masked portions 40 for the end surface having the masked portions 40. Then, the slurry 6 is hardened while at the same time removing the resin film 2 and the masked portions.

According to this embodiment, the honeycomb structure body 86 is produced by extrusion molding. Specifically, a cylindrical long honeycomb structure having a multiplicity of square cells is produced by use of a ceramic material making up cordierite, and cut to a predetermined length thereby to form the honeycomb structure body 86. The cell ends 82 of the honeycomb structure body 86 are all open to the end surfaces 861, 862.

Next, as shown in FIG. 11(*a*), the resin film 2 is attached to the whole of one end surface 861. In this embodiment, a thermoplastic resin film having a total thickness of 110 μm with an adhesive coated on one surface thereof is used.

As shown in FIG. 2, according to this embodiment, the portions of the resin film 2 corresponding to the cell ends 82 to be closed are melted or burned off by a high-density energy beam using the through hole forming device 5 described with reference to the first embodiment thereby to form the through holes 20.

As shown in FIG. 2, the through hole forming device 5 includes image processing means 51 for acquiring the positional information by recognizing the positions of the cell ends 82 visually through the resin film 2 attached to the end surface 861, heat radiation means 52 for radiating a high-density energy beam (laser beam) on the resin film 2, and control means 53 for determining the position of radiation of the high-density energy beam 520 and thus operating the heat radiation means 52 based on the positional information supplied from the image processing means 51.

The image processing means 51 includes a camera unit 511 for picking up an image of an end surface, and an image processing unit 512 for forming image data. A plurality of camera units 511 are preferably provided depending on the size of the particular end surface. This embodiment, however, is configured with a single camera unit 511 which is appropriately moved to image a plurality of areas sequentially.

The heat radiation means 52 includes a $CO_2$ laser emitter 521 and a moving unit 522 having built therein a control unit for the $CO_2$ laser emitter 52. One $CO_2$ laser emitter 521 is used in this embodiment for the reason of equipment cost, although the use of a plurality of $CO_2$ laser emitters 521 would improve the efficiency.

The control means 53 calculates the position and the opening area of each cell end 82 based on the image data received from the image processing means 51, and determines the positions of the cell ends 82 to be closed thereby to determine the positions where the through holes 20 are to be formed. It also determines the contour position 22 (FIG. 3) for cutting off the unrequired surrounding portion of the resin film 2. This information on the through hole forming positions and the contour position are supplied to the heat radiation means 52 thereby to control the movement and radiation of the $CO_2$ laser emitter 521.

By using the through hole forming device 5 having this configuration, as shown in FIG. 2, the image data is produced by imaging the end surface 861 of the honeycomb structure body 86 with the camera unit 511. Then, the control means 53 calculates the through hole forming positions and the contour position. According to this embodiment, the positions where the through holes are to be formed are determined in such a manner as to form a checkered pattern of the closed portions with alternating open and closed ends of adjacent cells. As the next step, the honeycomb structure is moved to a position under the laser radiation means or the radiation means is moved with the origin of the coordinate system just under the camera unit set to coincide with the origin of the coordinate system under the radiation means.

Based on the instruction from the control means 3, the laser beam 520 is sequentially radiated from the $CO_2$ laser emitter 521 and the resin film 2 is melted or burned off thereby to form the through holes 20 and the contour position 22.

As a result, as shown in FIG. 3, the resin film 2 having the unrequired peripheral portion 29 outside of the contour position 22 cut off and having the through holes 20 formed at positions corresponding to the cell ends to be closed is arranged on the end surface of the honeycomb structure body 86.

The squares lacking a peripheral portion thereof are not included in the checkered pattern but are filled with the closing material.

Figure 12:
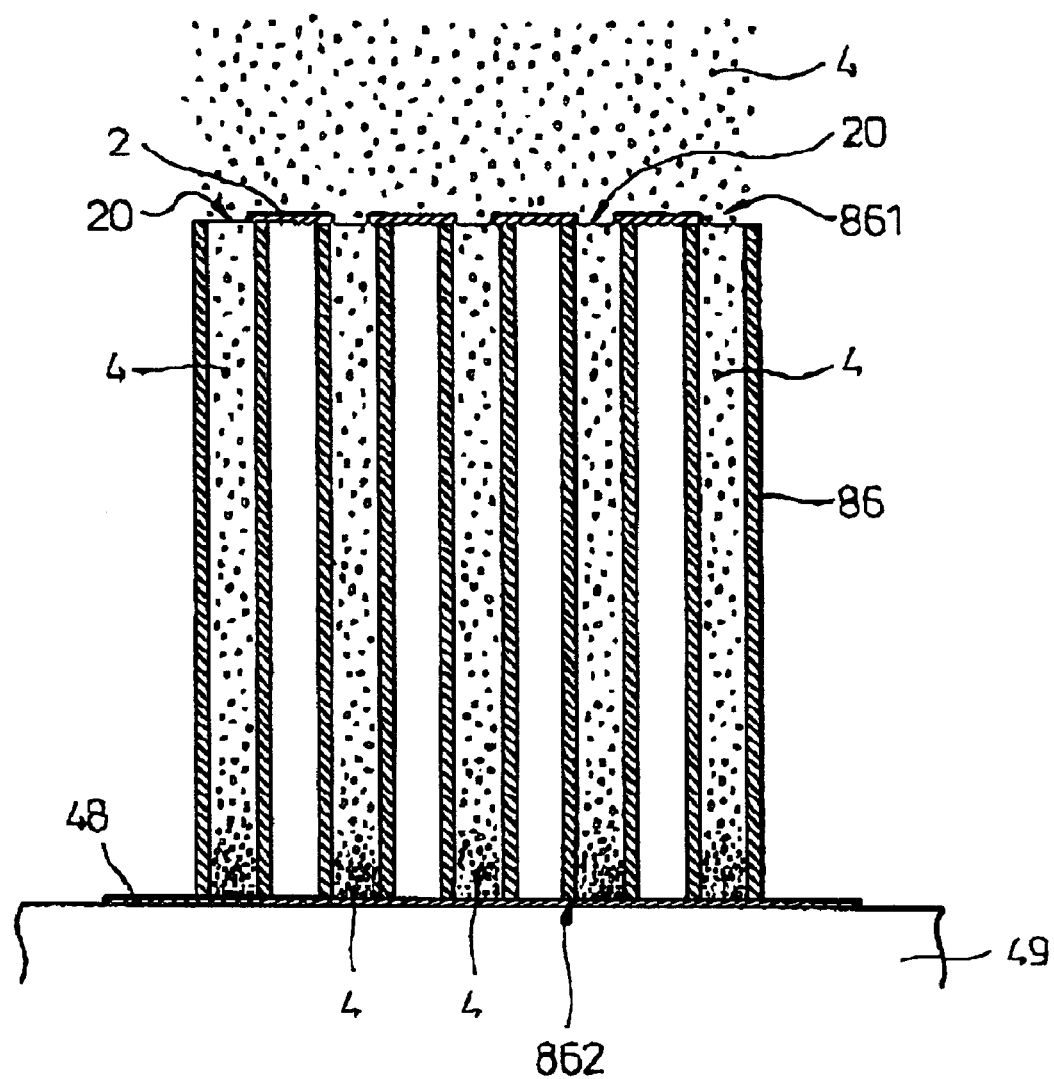
FIG. 12 is a diagram for explaining the step of charging the mask powder according to the seventh embodiment.

Then, as shown in FIG. 12, the honeycomb structure body 86 is placed on a base 49 with the end surface 861 having the resin film 20 facing up and the other end surface 862 facing down. In the process, a protective film 48 adapted not to be coupled with the masking powder 4 at the time of hardening the latter is laid on the upper surface of the base 49, and the honeycomb structure 86 is placed on the protective film 49. A heater is used as the base 49.

The masking powder 4 used in this embodiment contains, by weight, 55 parts of epoxy resin constituting thermosetting resin powder, 45 parts of high-density polyethylene constituting thermoplastic resin powder, three parts of Microsphere (trademark) constituting a foaming agent, and two parts of a surface active agent constituting a fluidity improver.

The masking powder 4 is charged by way of the through holes 20 of the resin film 2 and deposited on the cell ends of the other end surface 862.

Figure 13:
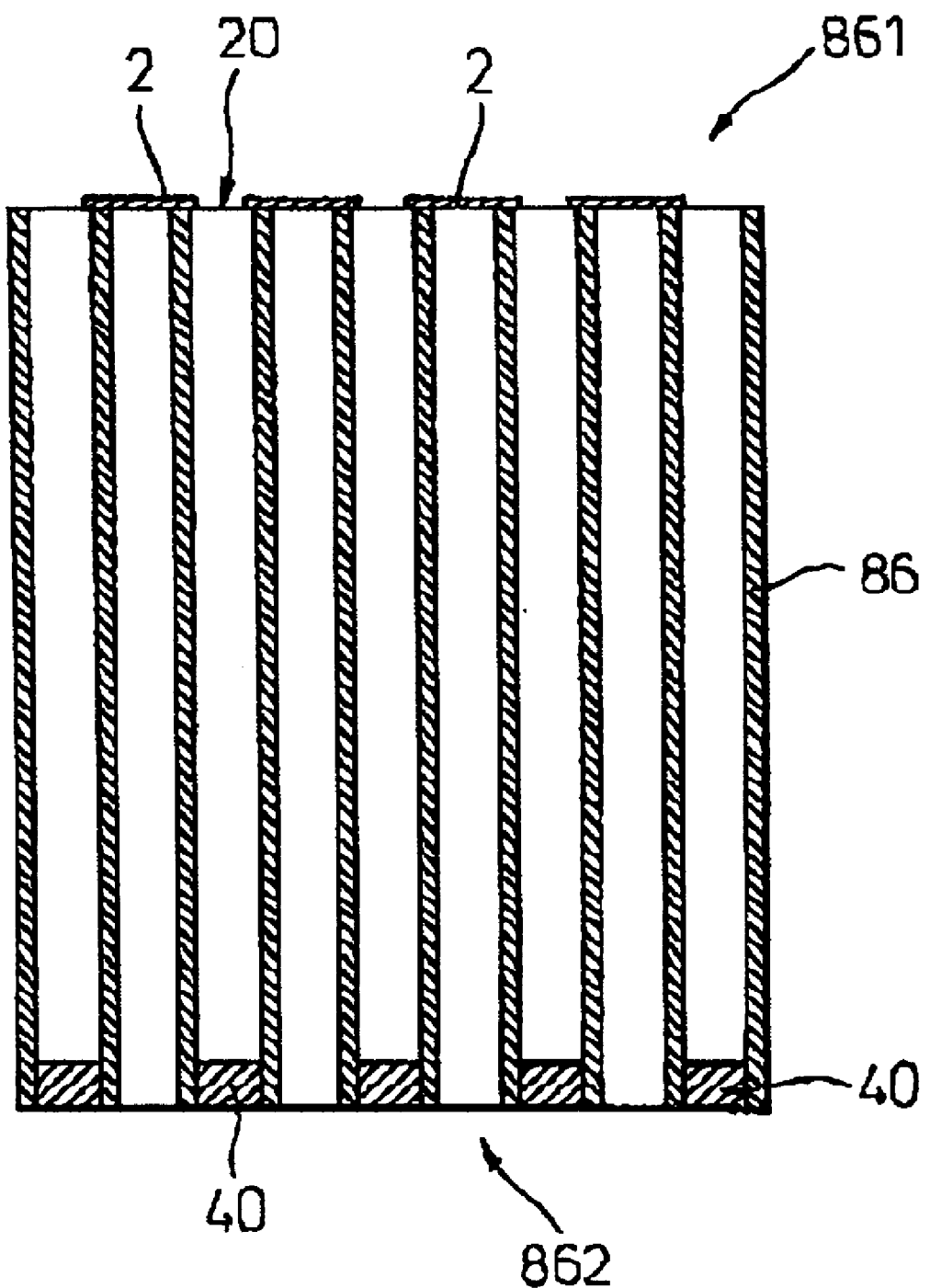
FIG. 13 is a diagram for explaining the state in which a mask portion 40 is formed according to the seventh embodiment.

Then, the masking powder 4 is heated by the base 49 providing the heater. As a result, as shown in FIG. 13, the masking powder 4 is melted and hardened to form the masked portions 40.

The next step is to dip the end surface 861 in the slurry 60 containing an end surface closing material, so that the slurry 60 is caused to enter the cell ends by way of the through holes. According to this embodiment, as shown in FIG. 4, a dipper 6 is used for this purpose. The dipper 6, as shown in FIG. 4, includes a handling unit 61 for holding and moving the honeycomb structure body 86 providing a work, a liquid tank 62 for storing the slurry 60 containing the end surface closing material composed of a main material adapted to constitute cordierite after baking, and a control unit 63 for controlling the handling unit 6. The control unit 63 is connected with a liquid level sensor 631 for detecting the liquid level of the slurry 60.

In conducting the work with the dipper 6, as shown in FIG. 4, the honeycomb structure body 86 is first placed on the base 64 with the end surface to be processed down. Then, the honeycomb structure body 86 is held and lifted to a predetermined height by the clamp 611 of the handling unit 6, and the handling unit 6 is moved thereby to move the honeycomb structure body 86 to a position over the slurry 60. The handling unit 6 is lowered to dip the end surface of the honeycomb structure body 86 in the slurry 60.

In the process, the control unit 63 calculates the dipping depth from the data of the liquid level sensor 631 and the vertical distance covered by the handling unit 6, and controls the handling unit 6 to attain the desired dipping depth.

As a result, at the end surface 861 of the honeycomb structure body 86 having the through holes 20, the slurry 60 enters the cell ends by way of the through holes 20.

Then, the work using a similar dipper 6 is conducted on the other end surface 862 of the honeycomb structure body 86. In this case, the slurry 60 enters the cell ends by way of the openings having no masked portions 40.

The liquid component of the slurry 60 that has entered each cell end 82 is dispersed inside the partitioning walls 81, and solidified with an increased solid concentration. After that, the honeycomb structure body 86 is baked.

In this way, the slurry 60 is baked and solidified into a closing material 830 which forms each closed portion 83. At the same time, the resin film 2 attached to the end surface 861 and the masked portions 40 arranged on the other end surface 862 are burned off. As a result, a honeycomb structure 8 with a part of the cell ends 82 thereof closed is obtained.

The operation and effects of the present embodiment will be explained.

In this embodiment, the process of filling wax and scraping out part of it as in the prior art is eliminated in the step of masking the two end surfaces of the honeycomb structure body 86. Specifically, the through holes 20 can be formed simply by heating the portions of the end surface 861 where the through holes 20 are to be formed in the resin film 2. Therefore, no object is required to be physically removed thereby simplifying the work greatly.

Also, the masking powder 4 can be charged easily using the resin film 2 only on the portions of the other end surface 862 requiring the masking. The masked portions 40 can be very easily formed by subsequently hardening the masking powder 4.

For this reason, the masking step can be remarkably improved over the prior art, thereby making it possible to reduce the working time, the number of steps and the production cost.

Further, according to this embodiment, the laser beam 520 providing a high-density energy beam is radiated on the resin film 2 thereby to form the through holes 20. As a result, the through holes 20 can be formed accurately and very easily.

In addition, according to this embodiment, the use of the through hole forming device 5 having the image processing means 51 described above makes it possible to accurately grasp the positions of the cell ends even at an end surface of a ceramic honeycomb structure which is unavoidably deformed delicately in the course of manufacture. Especially in this embodiment which uses a transparent or translucent resin film, the image processing means can be effectively utilized.

By automating the work of forming the through holes using the through hole forming device 5 described above, the efficiency can be remarkably improved as compared with the conventional manual work.

Also, the masking powder 4 can be charged accurately at the required positions by use of the through holes 20 of the resin film 2, thereby totally eliminating the problem of masking the two ends of a given cell erroneously. Thus, it is possible to produce a honeycomb structure 86 of high quality.

As described above, according to the manufacturing method of this embodiment, the process for closing a part of the cell ends at the two end surfaces of the honeycomb structure 86 can be rationalized, and therefore the productivity of the honeycomb structure 86 can be remarkably improved over the prior art.

Embodiment 8

According to the seventh embodiment described above, the slurry 60 is hardened by baking it at the same time as the honeycomb structure body 86. In the eighth embodiment, by contrast, the honeycomb structure body 86 is baked before the slurry 60 enters the cell ends of the honeycomb structure body 86. Also, the slurry 60 is made of a sealer (such as Aronceramic (trademark)) containing the ceramic which has such a characteristic as to harden after being charged, dried in the air for 15 to 20 minutes at room temperature and held at 110 to 120° C. for one hour.

Also in this case, similar functions and effects to those of the seventh embodiment are obtained.

Embodiment 9

According to this embodiment, the cell shape of the honeycomb structure body 86 is changed from the seventh embodiment. Specifically, in this embodiment, as shown in FIG. 5, the cells of the honeycomb structure body 86 are triangular in shape, so that all the cell ends 82 have a triangular shape.

Also in this case, the closed portions 83 can be formed by arranging the closing members 830 at a part of the cell ends 82, and the function and effects similar to the eighth and ninth embodiments can be obtained by the same method as in the seventh and eighth embodiments.

What is more noticeable is that also, according to this embodiment, the same through hole forming device 5 can be used as in the seventh embodiment. The through hole forming device 5, as described above, can determine the position of radiation of the high-density energy beam out of contact by image processing, thereby making it possible to follow the shape and size of the object of radiation very easily. Further, the mask portions 40 can be formed on the other end surface at accurate positions readily as long as the through holes 20 are accurately formed in the resin film 2.

As a result, the use of the through hole forming device 5 described above can produce a plurality of types of honeycomb structure on the same production line, thereby leading to a remarkable rationalization of the process.

What is claimed is:

1. A method of manufacturing a ceramic honeycomb structure in which a part of the cell ends located on an end surface of the honeycomb structure are closed, comprising the steps of:

fabricating a honeycomb structure body with the cell ends opened at the end surfaces and closing a part of the cell ends at an end surface of the honeycomb structure body, the cell end closing step including the substeps of;

attaching a film to said end surface of the honeycomb structure body in such a manner as to cover at least a part of the cell ends, forming through holes by thermally melting or burning off the film located at the cell ends to be closed, dipping said end surface in a slurry containing an end surface closing material thereby to cause the slurry to enter the cell ends by way of the through holes, and hardening the slurry while at the same time removing the film, wherein said through holes are formed in the film by radiating a high-density energy beam to the film and thereby melting or burning off the film, wherein said through holes are formed using the high-density energy beam in such a manner that the high-density energy beam is radiated first at the center of each through hole to be formed and the position of radiation is relatively displaced spirally to Increase the diameter of the through hole to the desired size, and wherein a transparent or translucent film is used and the positions to be irradiated with the high-density energy beam are determined based on the positional information of the cell ends acquired by an image processing means for recognizing the positions of the cell ends visually through the film attached to the end surface of the honeycomb structure body, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are couple to each other by superposing the duplicated areas thereby to produce the positional information on the cell ends for the entire end surface.

2. A method of manufacturing a ceramic honeycomb structure according to claim 1, wherein said high-density energy beam is a laser beam.

3. A method of manufacturing a ceramic honeycomb structure in which a part of the cell ends located on the end surfaces of the ceramic honeycomb structure are closed, comprising the steps of:

fabricating a honeycomb structure body with all the cell ends open on the end surfaces;

attaching a transparent or translucent resin film in such a manner as to cover one of the end surfaces of the honeycomb structure body;

forming through holes by radiating a high-density energy beam and thus melting or burning off the resin film portions located at the cell ends to be closed;

placing the honeycomb structure body on a base with the end surface having the resin film attached thereto up and the other end surface down;

charging the masking powder by way of the through holes of the resin film and depositing the masking powder at the cell ends of the other end surface;

forming mask portions by hardening the deposited masking powder;

dipping each end surface in a slurry containing an end surface closing material, and causing the slurry to enter the cell ends by way of the through holes at the end surface having the resin film attached thereto, and by way of openings lacking the mask portions at the end surface having the mask portions; and hardening the slurry while at the same time removing the resin film and the mask portions, wherein said masking powder contains a mixture of resin powders, at least one of said resin powders having a melting points, wherein the positions to be irradiated with the high-density energy beam are determined based on the positional information of the cell ends acquired by use of image processing means for recognizing the positions of the cell ends visually through the resin film attached to said end surfaces, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are coupled to each other by superposing the duplicated areas thereby to produce the positional information on the cell ends for the entire end surface.

4. A method of manufacturing a ceramic honeycomb structure according to claim 3, wherein the high-density energy beam is a laser beam.

5. A method of manufacturing a ceramic honeycomb structure according to claim 3, said masking powder contains thermosetting resin powder.

6. A method of manufacturing a ceramic honeycomb structure in which a part of the cell ends located on the end surfaces of the ceramic honeycomb structure are closed, comprising the steps of:

fabricating a honeycomb structure body with all the cell ends open on the end surfaces;

attaching a transparent or translucent resin film in such a manner as to cover one of the end surfaces of the honeycomb structure body;

forming through holes by radiating a high-density energy beam and thus melting or burning off the resin film portions located at the cell ends to be closed;

placing the honeycomb structure body on a base with the end surface having the resin film attached thereto up and the other end surface down;

charging the masking powder by way of the through holes of the resin film and depositing the masking powder at the cell ends of the other end surface;

forming mask portions by hardening the deposited masking powder;

dipping each end surface in a slurry containing an end surface closing material, and causing the slurry to enter the cell ends by way of the through holes at the end surface having the resin film attached thereto, and by way of openings lacking the mask portions at the end surface having the mask portions; and hardening the slurry while at the same time removing the resin film and the mask portions, wherein said masking powder contains thermosetting resin powder, wherein said masking powder contains a foaming agents, wherein the positions to be irradiated with the high-density energy beam are determined based on the positional information of the cell ends acquired by use of image processing means for recognizing the positions of the cell ends visually through the resin film attached to said end surfaces, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are couple to each other by superposing the duplicated areas thereby to produce the positional information on the cell ends for the entire end surface.

7. A method of manufacturing a ceramic honeycomb structure in which a part of the cell ends located on the end surfaces of the ceramic honeycomb structure are closed, comprising the steps of:

fabricating a honeycomb structure body with all the cell ends open on the end surfaces;

attaching a transparent or translucent resin film in such a manner as to cover one of the end surfaces of the honeycomb structure body;

forming through holes by radiating a high-density energy beam and thus melting or burning off the resin film portions located at the cell ends to be closed;

placing the honeycomb structure body on a base with the end surface having the resin film attached thereto up and the other end surface down;

charging the masking powder by way of the through holes of the resin film and depositing the masking powder at the cell ends of the other end surface;

forming mask portions by hardening the deposited masking powder;

dipping each end surface in a slurry containing an end surface closing material, and causing the slurry to enter the cell ends by way of the through holes at the end surface having the resin film attached thereto, and by way of openings lacking the mask portions at the end surface having the mask portions; and hardening the slurry while at the same time removing the resin film and the mask portions, wherein said masking powder contains thermosetting resin powder, wherein said masking powder contains a fluidity improver for improving the fluidity at the time of charging the masking powders, wherein the positions to be irradiated with the high-density energy beam are determined based on the positional information of the cell ends acquired by use of image processing means for recognizing the positions of the cell ends visually through the resin film attached to said end surfaces, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are coupled to each other by superposing the duplicated areas thereby to produce the positional information on the cell ends for the entire end surface.

8. A method of manufacturing a ceramic honeycomb structure in which a part of the cell ends at an end surface of the ceramic honeycomb structure is closed, wherein the process for closing a part of the cell ends of an end surface of a honeycomb structure body fabricated with the cell ends open to the end surface includes the steps of:

acquiring the positional Information on the cell ends using an image processing means for recognizing the positions of the cell ends;

attaching a film to said end surface of the honeycomb structure body in such a manner as to cover at least a part of the cell ends;

forming through holes by thermally melting or burning off the portions of the film located at the cell ends to be dosed based on the positional information;

dipping said end surface in a slurry containing an end surface closing material and thereby causing the slurry to enter the cell ends by way of the through holes; and hardening the slurry while at the same time removing the film, wherein the through holes of the film are formed by radiating a high-density energy beam on the film and thereby melting or burning off the film, and wherein said through holes are formed using the high-density energy beam in such a manner that the high-density energy beam is radiated first at the center of each through hole to be formed and the position of radiation is relatively displaced spirally to increase the diameter of the through hole to the desired size, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are couple to each other by superposing the duplicated areas thereby to produce the positional information on the cell ends for the entire end surface.

9. A method of manufacturing a ceramic honeycomb structure according to claim 8, wherein said high-density energy beam is a laser beam.

10. A method of manufacturing a ceramic honeycomb structure according to claim 1, 8 or 9, wherein the size of each through hole formed in the film attached to the cell ends is changed in accordance with the opening area of each cell end.

11. A method of manufacturing a ceramic honeycomb structure according to claim 1, 8, or 9, wherein said through holes are formed substantially in a shape about the center of gravity of the opening area of each cell end.

12. A method of manufacturing a ceramic honeycomb structure according to claim 1, 8, or 9, wherein said film is a resin film or a wax sheet.

13. A method of manufacturing a ceramic honeycomb structure, in which a part of the cell ends located on an end surface of the honeycomb structure are closed, comprising the steps of:

fabricating a honeycomb structure body with the cell ends opened at the end surfaces and closing a part of the cell ends at an end surface of the honeycomb structure body, the cell end closing step including the substeps of;

attaching a film to said end surface of the honeycomb structure body in such a manner as to cover at least a part of the cell ends, forming through holes by thermally melting or burning off the film located at the cell ends to be closed by radiating a high-density energy beam, dipping said end surface in a slurry containing an end surface closing material thereby to cause the slurry to enter the cell ends by way of the through holes, and hardening the slurry while at the same time removing the film, wherein a transparent or translucent film is used and the positions to be irradiated with the high-density energy beam are determined based on the positional information of the cell ends acquired by an image processing means for recognizing the positions of the cell ends visually through the film attached to the end surface of the honeycomb structure body, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are coupled to each other by superposing the duplicated areas thereby to produce the positional information on the cell ends for the entire end surface, and wherein said image processing means collects the image data using a camera fixed in position while the honeycomb structure body is moved to locate each of the blocks sequentially within the range of visual field of the camera.

14. A method of manufacturing a ceramic honeycomb structure in which a part of the cell ends located on an end surface of the honeycomb structure are closed, comprising the steps of:

fabricating a honeycomb structure body with the cell ends opened at the end surfaces and closing a part of the cell ends at an end surface of the honeycomb structure body, the cell end closing step including the substeps of;

attaching a film to said end surface of the honeycomb structure body in such a manner as to cover at least a part of the cell ends, forming through holes by thermally melting or burning off the film located at the cell ends to be closed by radiating a high-density energy beam, dipping said end surface in a slurry containing an end surface closing material thereby to cause the slurry to enter the cell ends by way of the through holes, and hardening the slurry while at the same time removing the film, wherein a transparent or translucent film is used and the positions to be irradiated with the high-density energy beam are determined based on the positional information of the cell ends acquired by an image processing means for recognizing the positions of the cell ends visually through the film attached to the end surface of the honeycomb structure body, wherein the image processing means produces the positional information of the cell ends in such a manner that said end surface of the honeycomb structure body is segmented into a plurality of blocks, for each of which the image data for an area including the particular block and a portion duplicated with at least a part of an adjacent block is collected, and the image data for all the blocks are coupled to each other by superposing the duplicated areas thereby to produce the positional information on the cell ends for the entire end surface, and wherein said through holes are formed for each block, and in the presence of a block distant from any adjacent block immediately after completely forming the through holes for a given block, the through holes are formed for said distant block.

15. A method of manufacturing a ceramic honeycomb structure according to claim 6 or 7, wherein the positions to be irradiated with the high-density energy beam are determined based on the positional information of the cell ends acquired by use of image processing means for recognizing the positions of the cell ends visually through the resin film attached to said end surfaces.

16. A method of manufacturing a ceramic honeycomb structure according to claim 6 or 7, wherein the high-density energy beam is a laser beam.

17. A method of manufacturing a ceramic honeycomb structure according to claim 1 or 8, wherein said through holes are formed so that none of the film remains in the respective cell ends.

18. A method of manufacturing a ceramic honeycomb structure according to claim 7, wherein the fluidity improver comprises at least one of a surface active agent having a surface lubrication effect and a surface active agent having a function to prevent surface charging.

19. A method of manufacturing a ceramic honeycomb structure according to claim 13 or 14, said high-density energy beam is a laser beam.

* * * * *